United States Patent
Duquette et al.

(10) Patent No.: US 10,494,074 B1
(45) Date of Patent: Dec. 3, 2019

(54) INTERCOOLER FOR A WATERCRAFT

(71) Applicant: BOMBARDIER RECREATIONAL PRODUCTS INC., Valcourt (CA)

(72) Inventors: Mathieu Duquette, Sherbrooke (CA); Charles Normand, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 662 days.

(21) Appl. No.: 15/189,080

(22) Filed: Jun. 22, 2016

Related U.S. Application Data

(60) Provisional application No. 62/183,016, filed on Jun. 22, 2015.

(51) Int. Cl.
| | |
|---|---|
| *B63J 2/06* | (2006.01) |
| *F02B 29/04* | (2006.01) |
| *F02M 35/16* | (2006.01) |
| *F02M 35/10* | (2006.01) |
| *B63H 11/00* | (2006.01) |
| *B63H 21/14* | (2006.01) |
| *B63B 35/73* | (2006.01) |

(52) U.S. Cl.
CPC ............... *B63J 2/06* (2013.01); *B63B 35/731* (2013.01); *B63H 11/00* (2013.01); *B63H 21/14* (2013.01); *F02B 29/0406* (2013.01); *F02M 35/10157* (2013.01); *F02M 35/167* (2013.01)

(58) Field of Classification Search
CPC ............................. B63B 35/731; F02B 29/0406
See application file for complete search history.

(56) References Cited

U.S. PATENT DOCUMENTS

| | | | | |
|---|---|---|---|---|
| 6,612,883 | B2 | 9/2003 | Gokan et al. | |
| 6,634,420 | B2* | 10/2003 | Gokan | F02B 29/0462 123/563 |
| 6,655,307 | B2* | 12/2003 | Gokan | F01M 1/02 114/55.5 |
| 6,659,089 | B2* | 12/2003 | Gokan | B63B 35/731 123/559.1 |
| 6,676,464 | B2* | 1/2004 | Gokan | B63H 21/14 440/39 |
| 6,688,928 | B2* | 2/2004 | Gokan | F01M 1/02 123/196 R |
| 6,699,088 | B2* | 3/2004 | Gokan | B63H 21/305 440/111 |

(Continued)

*Primary Examiner* — S. Joseph Morano
*Assistant Examiner* — Jovon E Hayes
(74) *Attorney, Agent, or Firm* — BCF LLP

(57) ABSTRACT

A watercraft includes a deck and a hull having a transom, right and left side portions a tunnel, and a bottom portion. An air intake system disposed in the engine compartment and fluidly communicating with an engine includes an air compressor and an intercooler. The intercooler includes a housing having a lower surface extending generally along the bottom hull portion, an upper surface extending thereabove, an intercooler air inlet, an intercooler air outlet spaced from the intercooler air inlet at least in a direction parallel to the lower surface, a water inlet, and a water outlet. An intercooler core enclosed within the housing defines at least one air channel fluidly communicating with the intercooler air inlet and the intercooler air outlet. At least one water channel fluidly communicating with the water inlet and outlet is diathermally connected with the at least one air channel for cooling air flowing therein.

20 Claims, 16 Drawing Sheets

(56) References Cited

U.S. PATENT DOCUMENTS

| | | | | |
|---|---|---|---|---|
| 6,746,288 B2* | 6/2004 | Gokan | ................... | B63H 21/24 |
| | | | | 440/88 F |
| 6,752,010 B2* | 6/2004 | Gokan | ................. | F02B 61/045 |
| | | | | 73/114.31 |
| 6,910,525 B2* | 6/2005 | Gokan | ................ | F02B 29/0462 |
| | | | | 123/563 |
| 6,918,804 B2* | 7/2005 | Matsuda | ............... | B63B 35/731 |
| | | | | 123/559.1 |
| 6,942,017 B2* | 9/2005 | Gokan | ................ | F02B 29/0462 |
| | | | | 123/563 |
| 7,343,906 B2* | 3/2008 | Ozawa | ................. | B63B 35/731 |
| | | | | 123/559.1 |
| 7,367,856 B2* | 5/2008 | Takahashi | ............. | B63B 35/731 |
| | | | | 440/88 A |
| 7,458,865 B2* | 12/2008 | Araki | ................... | B63B 35/731 |
| | | | | 440/52 |
| 7,458,868 B2* | 12/2008 | Mineo | ................. | B63B 35/731 |
| | | | | 440/88 C |
| 7,543,450 B2* | 6/2009 | Miura | ................ | F02B 29/0462 |
| | | | | 60/597 |
| 7,694,654 B2* | 4/2010 | Hoi | ........................ | F01P 3/202 |
| | | | | 123/41.29 |
| 7,832,383 B2* | 11/2010 | Ozaki | ................ | F02B 29/0475 |
| | | | | 123/564 |
| 8,038,491 B2* | 10/2011 | Ozawa | .................. | B63H 23/00 |
| | | | | 440/83 |
| 8,151,772 B2* | 4/2012 | Wilflinger | ............... | F02B 33/40 |
| | | | | 123/559.1 |
| 8,616,185 B2 | 12/2013 | Wilflinger et al. | | |
| 8,783,234 B2* | 7/2014 | Araki | ..................... | F02B 33/40 |
| | | | | 123/559.1 |

* cited by examiner

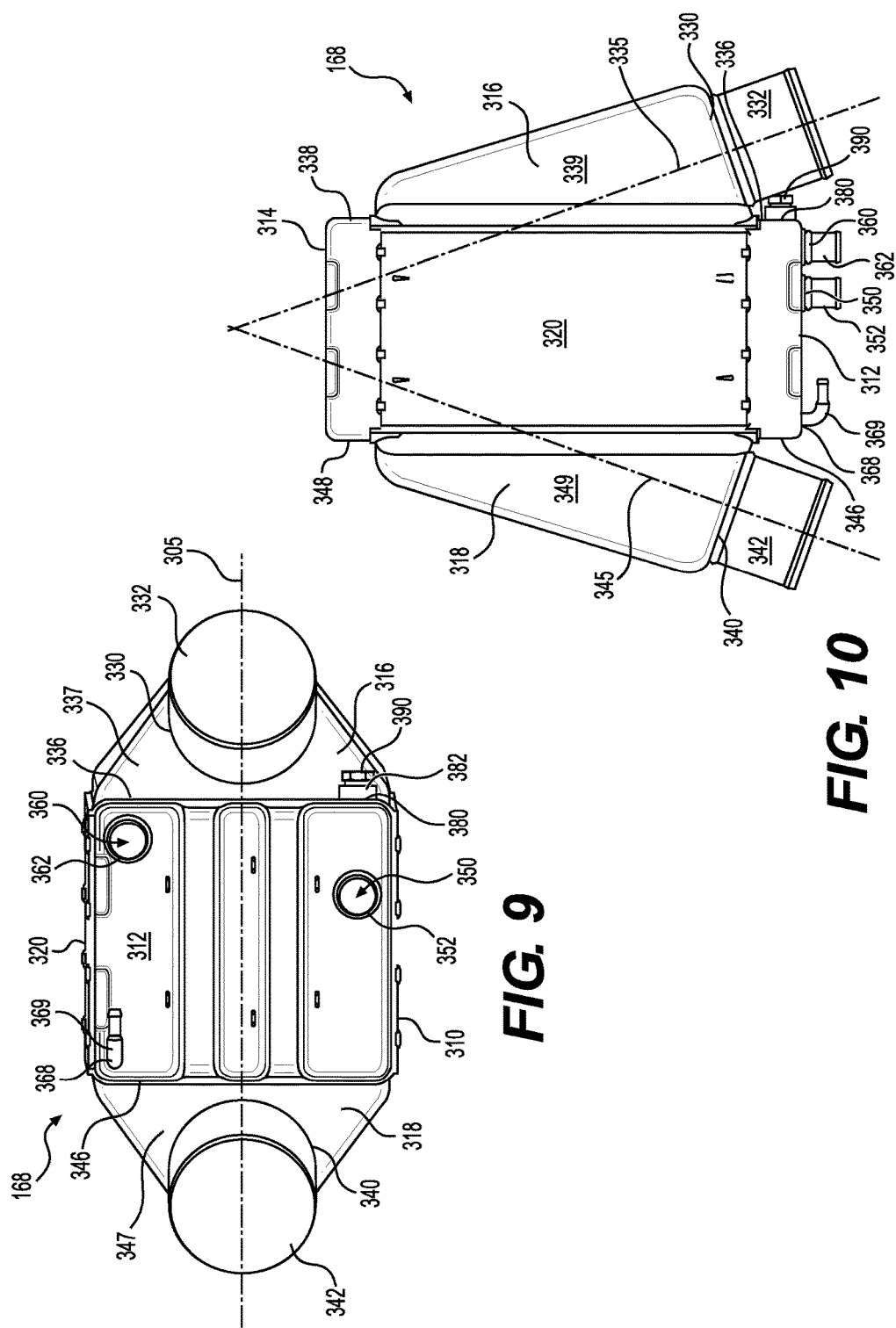

INTERCOOLER FOR A WATERCRAFT

CROSS-REFERENCE

The present application claims priority to U.S. Provisional Patent Application No. 62/183,016 filed on Jun. 22, 2015, the entirety of which is incorporated herein by reference.

FIELD OF TECHNOLOGY

The present technology relates to intercoolers for watercraft.

BACKGROUND

The efficiency of the combustion process in an internal combustion engine can be increased by decreasing the temperature of the air entering the engine for combustion. A decrease in air intake temperature provides a denser intake charge to the engine and allows more air and fuel to be combusted per engine cycle, thereby increasing the output power of the engine. The air intake system in a personal watercraft (PWC) often includes a supercharger for compressing intake air, and an intercooler for cooling the compressed air before delivery to the engine. The intercooler typically comprises a box-like housing enclosing a heat transfer block made of metallic walls defining air and water channels extending through the intercooler. The jet pump of the jet propulsion system for propelling the PWC is used to pump cool lake water through the intercooler water channels. Hot compressed air flowing through the air channels of the intercooler is cooled by heat exchange with cool lake water flowing in the water channels.

While it is convenient to use lake or sea water to cool the air delivered to the engine, the cooling water, especially if it is salt water, can corrode the metallic walls of the water channels, which can reduce the efficacy of the intercooler and, ultimately, lead to failure of part. It is therefore desirable to reduce the corrosion of the intercooler in order to maintain its efficacy and extend its useful life. Typically, intercoolers in PWCs are mounted high within the engine compartment such that, once the PWC is docked, any cooling water that remains is drained out of the intercooler.

SUMMARY

It is an object of the present technology to ameliorate at least some of the inconveniences present in the prior art.

In accordance with one aspect of the present technology, there is provided a watercraft including a deck and a hull disposed under the deck and defining an engine compartment therewith. The hull defines a longitudinal centerplane extending longitudinally and vertically. The hull includes a transom extending generally laterally and vertically, a right side portion extending forwardly from a right side of the transom, and a left side portion extending forwardly from a left side of the transom. A tunnel extends forwardly from the transom. The tunnel is disposed between the left side portion and the right side portion. A bottom portion extends forwardly from a bottom of the transom and a bottom of the tunnel, the bottom portion extends between a bottom of the left side portion and a bottom of the right side portion. An engine is disposed in the engine compartment and has an engine air inlet. A jet propulsion system is operatively connected to the engine and disposed at least in part in the tunnel. An air intake system is disposed at least in part in the engine compartment and fluidly communicates with the engine air inlet for delivering air thereto. The air intake system includes an air compressor and an intercooler. The intercooler includes a housing having a lower surface extending generally along the bottom portion of the hull and an upper surface extending above the lower surface. An intercooler air inlet is fluidly connected to the air compressor. An intercooler air outlet is fluidly connected to the engine air inlet and spaced from the intercooler air inlet at least in a direction parallel to the lower surface. A water inlet is fluidly connected to the jet propulsion system. A water outlet is fluidly connected to an exterior of the engine compartment. An intercooler core is enclosed within the housing and defines at least one air channel fluidly communicating with the intercooler air inlet and the intercooler air outlet. At least one water channel fluidly communicates with the water inlet and the water outlet. The at least one water channel is diathermally connected with the at least one air channel for cooling air flowing in the at least one air channel between the intercooler air inlet and the intercooler air outlet.

In some implementations, a majority of the intercooler core is disposed below a water line of the watercraft when the watercraft is unloaded and docked in level water.

In some implementations, an upper surface of the transom is disposed vertically higher than the at least one water channel.

In some implementations, the tunnel comprises an upper wall, and the upper wall of the tunnel is disposed vertically higher than a majority of the at least one water channel.

In some implementations, the intercooler air inlet has a central air inlet axis, the intercooler air outlet has a central air outlet axis, an intercooler plane containing the central air inlet axis and the central air outlet axis is disposed between the upper and lower surfaces of the intercooler, and an intersection of the intercooler plane with the transom is disposed entirely below an upper surface of the transom.

In some implementations, an intersection of the intercooler plane with the tunnel is disposed vertically lower than an upper wall of the tunnel.

In some implementations, the watercraft includes a driveshaft and a driveshaft opening defined by the hull, the driveshaft extending through the driveshaft opening for operatively connecting the jet propulsion system to the engine, the driveshaft opening and the upper wall of the tunnel being disposed on opposite sides of the intercooler plane.

In some implementations, the at least one air channel extends in a direction parallel to the intercooler plane.

In some implementations, a foam member is disposed on the bottom portion of the hull, the lower surface of the intercooler being disposed on the foam member.

In some implementations, the at least one air channel extends in a generally lateral direction, and the at least one water channel extends in a generally longitudinal direction.

In some implementations, the intercooler core is made of one of: aluminum and an alloy thereof.

In some implementations, the intercooler further includes an anode member disposed vertically lower than a water line of the watercraft, the anode member being disposed closer to the lower surface of the intercooler than to the upper surface thereof.

In some implementations, the anode member is disposed on a laterally inner portion of the intercooler.

In some implementations, the intercooler further comprises an anode opening defined in the housing. The anode member includes an anode holder mounted to the housing adjacent the anode opening and an anode mounted to the anode holder and extending therefrom into the at least one water channel.

In some implementations, the anode holder is threaded and thereby threadedly mounted to the housing adjacent the anode opening.

In some implementations, the housing of the intercooler comprises a boss having the anode opening defined therein. The boss is internally threaded and a portion of the anode holder is externally threaded and thereby threadedly mounted to the boss.

In some implementations, the intercooler is disposed on one side of the longitudinal centerplane and longitudinally rearward of the engine.

In some implementations, the air compressor is a supercharger. The supercharger is disposed rearward of the engine and longitudinally forward of the intercooler.

In some implementations, the air intake system further includes an airbox fluidly connected to the supercharger for delivering atmospheric air thereto, the airbox being disposed forward of the engine. The airbox has an airbox air inlet facing generally forwardly away from the engine. The airbox has an airbox air outlet facing generally rearwardly toward the engine. The supercharger has a supercharger air inlet facing generally rearwardly away from the engine. The intercooler air inlet and the intercooler air outlet face generally forwardly.

In some implementations, an exhaust system includes a muffler and a resonator, the muffler and the resonator being disposed longitudinally rearward of the engine. The muffler is disposed on one of a left side and a right side of the longitudinal centerplane, the intercooler is disposed on an other of the left side and the right side of the longitudinal centerplane, and the resonator is disposed on an upper wall of the tunnel.

In some implementations, the intercooler air inlet has a central intercooler air inlet axis, the intercooler air outlet has a central intercooler air outlet axis, and an intercooler plane containing the central air inlet axis and the central air outlet axis is disposed between the upper and lower surfaces of the intercooler. An intersection of the intercooler plane with the transom intersects one of the left side portion and the right side portion of the hull. The one of the left side portion and the right side portion extending on the same side of the longitudinal centerplane as the intercooler. The intersection of the intercooler plane with transom intersects the bottom portion on an opposite side of the longitudinal centerplane from the intercooler.

In some implementations, the intercooler air inlet has a central intercooler air inlet axis, the intercooler air outlet has a central intercooler air outlet axis, and an intercooler plane containing the central air inlet axis and the central air outlet axis is disposed between the upper and lower surfaces of the intercooler. An intersection of the intercooler plane with the transom is disposed generally parallel to a portion of the bottom portion of the hull disposed below the intercooler In some implementations, the intercooler air inlet has a central intercooler air inlet axis, the intercooler air outlet has a central intercooler air outlet axis, and an intercooler plane containing the central air inlet axis and the central air outlet axis is disposed between the upper and lower surfaces of the intercooler. An intersection of the intercooler plane with an upper surface of the hull is disposed longitudinally forward of the engine.

In some implementations, the intersection of the intercooler plane with the upper surface of the hull disposed longitudinally forward of the engine includes a left side portion intersection of the intercooler plane with the left side portion of the hull, and a right side portion intersection of the intercooler plane with the right side portion of the hull.

For purposes of the present application, terms related to spatial orientation when referring to a watercraft and components in relation to the watercraft, such as "forwardly", "rearwardly", "left", "right", "above" and "below", are as they would be understood by a driver of the watercraft, with the watercraft in a straight ahead orientation (i.e. not steered left or right), and in an upright position (i.e. not tilted or trimmed).

The explanations provided herein regarding the above terms take precedence over explanations of these terms that may be found in the documents incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy these object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 9 is a front elevation view of the intercooler of FIG. 8;

FIG. 10 is a top plan view of the intercooler of FIG. 8;

DETAILED DESCRIPTION

Figure 1A:
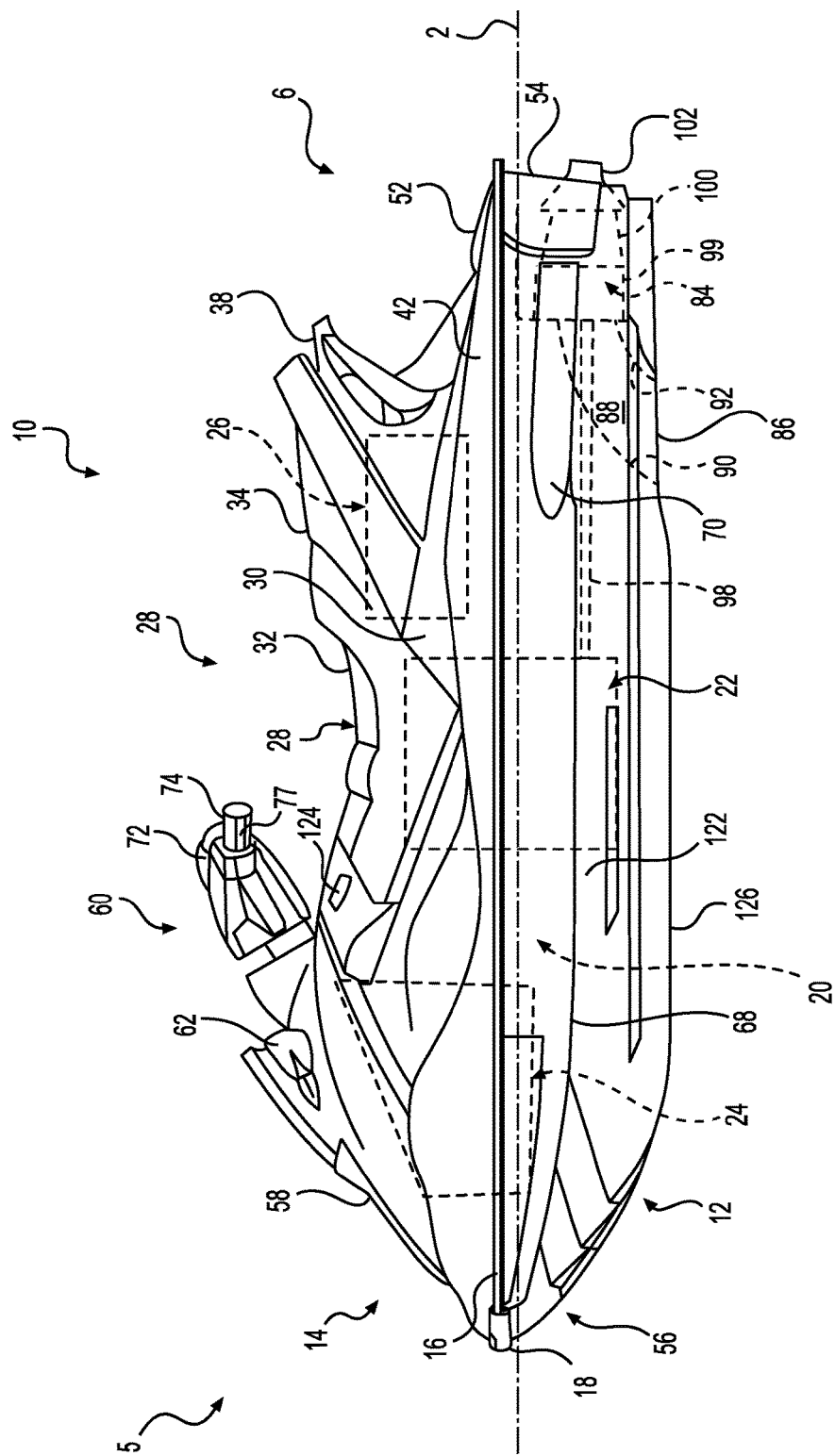
FIG. 1A is a left side elevation view of a personal watercraft (PWC)

The technology will be described herein with respect to a PWC but it is contemplated that aspects of the present technology could be applied to other watercraft.

Referring to FIGS. 1A to 1E, a personal watercraft (PWC) 10 has a bow 5 and a stern 6. The PWC 10 includes a hull 12 and a deck 14. The deck 14 is designed to accommodate a driver and one or more passengers of the PWC 10. The hull 12 buoyantly supports the PWC 10 in the water. The hull 12 and deck 14 are joined together at a seam 16 that joins the parts in a sealing relationship. The hull 12 and deck 14 are joined by fasteners such as rivets or screws. However it is contemplated that the seam 16 could comprise a bond line formed by an adhesive. Other known joining methods could also be used to sealingly engage the parts together, including but not limited to thermal fusion or molding. A bumper 18 generally covers the seam 16, which helps to prevent damage to the outer surface of the PWC 10 when the PWC 10 is docked, for example. The bumper 18 can extend around the bow 5, as shown, or around any portion or the entire length of the seam 16.

The space between the hull 12 and the deck 14 forms a volume commonly referred to as the engine compartment 20. The engine compartment 20 accommodates an engine 22 (shown schematically in FIG. 1A) as well as a fuel tank 150, and a powerpack connected to the engine 22 including an air intake system 160, an exhaust system 190, an electrical system (battery, electronic control unit, etc.), and other such elements used for operating the PWC 10. A driveshaft 98 is operatively connected to the engine 22 and extends rearwardly therefrom in the engine compartment 20 to connect to a jet propulsion system 84 for propelling the PWC 10. The engine compartment 20 also accommodates a front storage box 24 and a rear removable storage box 26, both of which are shown schematically in FIG. 1A. The hull 12, the engine compartment 20, the engine 22 and various components of the powerpack will be discussed in further detail below.

The jet propulsion system 84, which is housed outside the engine compartment 20, pressurizes water to create thrust and thereby propel the PWC 10. The jet propulsion system 84 includes a jet pump 99 and a venturi 100. With reference to FIGS. 1A and 1E, the jet pump 99, which operates in a known manner, has a cylindrical housing enclosing an impeller and a stator. The driveshaft 98 is connected to the impeller for rotating the impeller and thereby propelling the PWC 10 in a known manner. The venturi 100 is mounted to the rear end of the jet pump 99 such that water exiting the jet pump 99 goes through the venturi 100. Since the venturi's exit diameter is smaller than its entrance diameter, pressurized water from the jet pump 99 passing through the venturi 100 is accelerated further, thereby providing more thrust for propulsion of the PWC 10. A steering nozzle 102 is connected to the jet propulsion system 84 for steering the PWC 10. The steering nozzle 102 is pivotably mounted to the rear end of the venturi 100. The steering nozzle 102 pivots about a vertical axis 104 (FIGS. 1C and 1E) to redirect the water jet being expelled from the venturi 100, and thereby redirect the thrust propelling the PWC 10. The steering nozzle 102 can also be trimmed about a horizontal trim axis. It is contemplated that, the steering nozzle 102, the PWC 10 could be provided with a rudder, tabs on the transom 54, or other diverting mechanism disposed at the exit of the venturi 100 to selectively direct the thrust generated by the jet propulsion system 84 to effect turning.

Figure 1B:
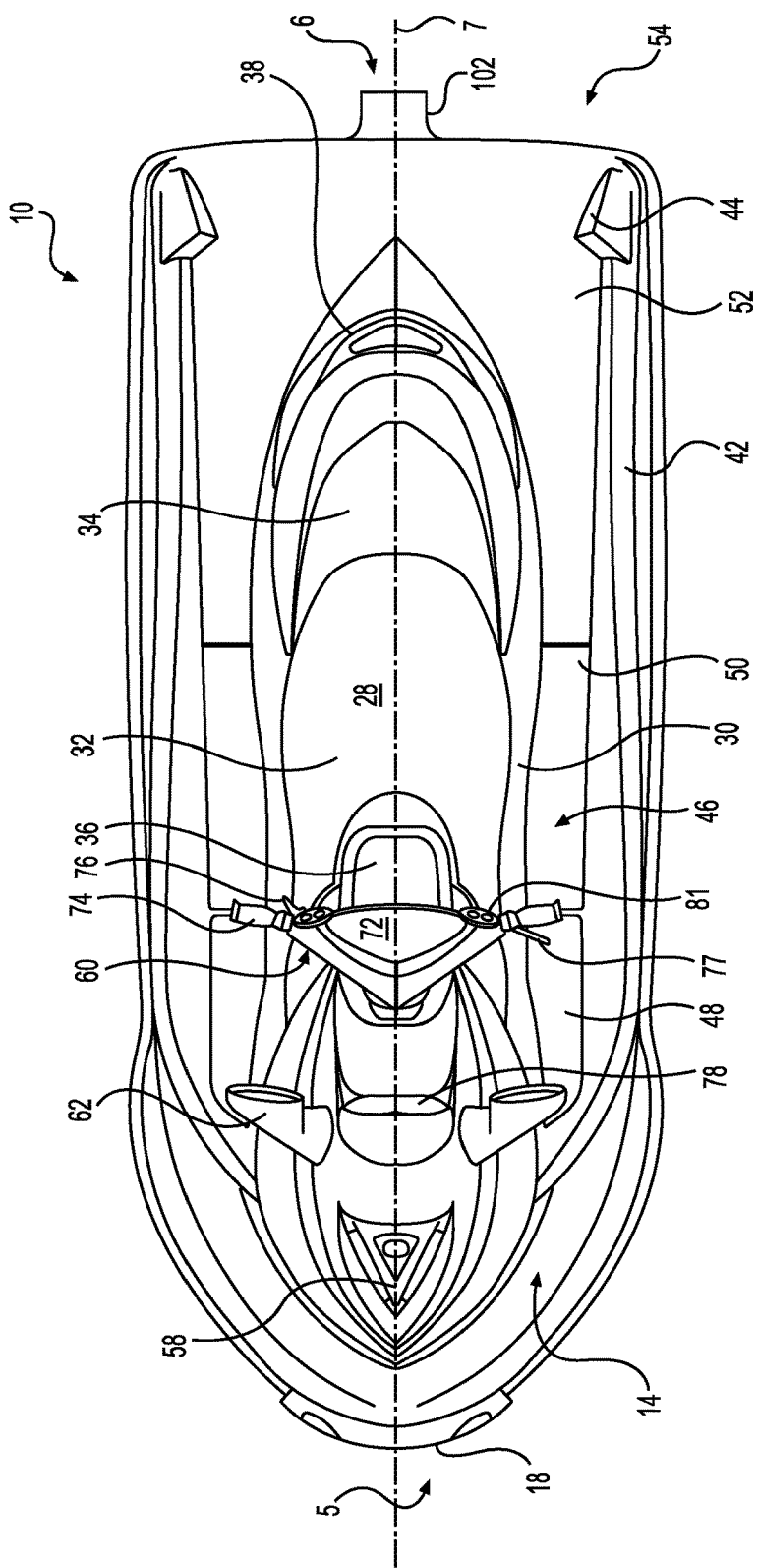
FIG. 1B is a top plan view of the PWC of FIG. 1A.

As seen in FIGS. 1A and 1B, the deck 14 has a centrally positioned straddle-type seat 28 mounted on top of a pedestal 30 to accommodate multiple riders in straddling positions. The seat 28 includes a front seat portion 32 for a driver of the PWC 10 and a rear seat portion 34 for a passenger. The rear seat portion 34 is raised compared to the front seat portion 32 so that the passenger seated thereon can see above the driver seated in the front seat portion 32. The seat portions 32, 34 can be individually tilted or removed completely.

The front seat portion 32 covers an engine access opening defined by a top portion of the pedestal 30 to provide access to the engine 22. The rear seat portion 34 covers the rear removable storage box 26. A small storage box 36 is also provided in front of the seat 28. A grab handle 38 is provided between the pedestal 30 and the rear of the seat 28 to provide a handle onto which a passenger may hold.

Footrests 46, located on either side of the pedestal 30, are designed to accommodate the riders' feet in various riding positions. A reboarding platform 52 is provided at the rear of the PWC 10 on the deck 14 to allow the driver or a passenger to easily reboard the PWC 10 from the water.

The PWC 10 has a pair of generally upwardly extending walls located on either side of the PWC 10 known as gunwales or gunnels 42. The gunnels 42 help to prevent the entry of water in the footrests 46 of the PWC 10, provide lateral support for the riders' feet, and also provide buoyancy when turning the PWC 10, since personal watercraft can roll slightly when turning. Towards the rear of the PWC 10, the gunnels 42 extend inwardly to act as heel rests 44 for a rearward facing passenger of the PWC 10.

A helm assembly 60, including a central helm portion 72 and a pair of handlebars 74, is positioned forwardly of the seat 28. The steering nozzle 102 is operatively connected to the helm assembly 60 for steering the watercraft. Turning the helm assembly 60 with the handlebars 74 turns the steering nozzle 102 about the pivot axis 104. The right handlebar 74 is provided with a throttle operator 76, which allows the rider to control the engine 22, and therefore the speed of the PWC 10. The left handlebar 74 is provided with a reverse gate operator 77 used by the driver to actuate a reverse gate (not shown) and thereby apply a rearward thrust to the PWC 10.

A hood 58 located forwardly the helm assembly 60 covers the front storage box 24 to prevent water from entering the front storage box 24. The hood 58 is hinged to provide access to the front storage box 24. Rearview mirrors 62 are positioned on either side of hood 58 to allow the rider to see behind the PWC 10.

A display area or cluster 78 (FIG. 1B) is located forwardly of the helm assembly 60. Display control buttons 80 provided on the central helm portion 72 allow the driver to modify the display data or mode (speed, engine rpm, time, etc.) on the display cluster 78 or to change a condition of the PWC 10, such as trim (which will affect the pitch of the PWC 10). The helm assembly 60 is provided with a key receiving post 82 (FIG. 1E) located near a center of the central helm portion 72. The key receiving post 82 is adapted to receive a key (not shown) that allows starting of the PWC 10.

Figure 1C:
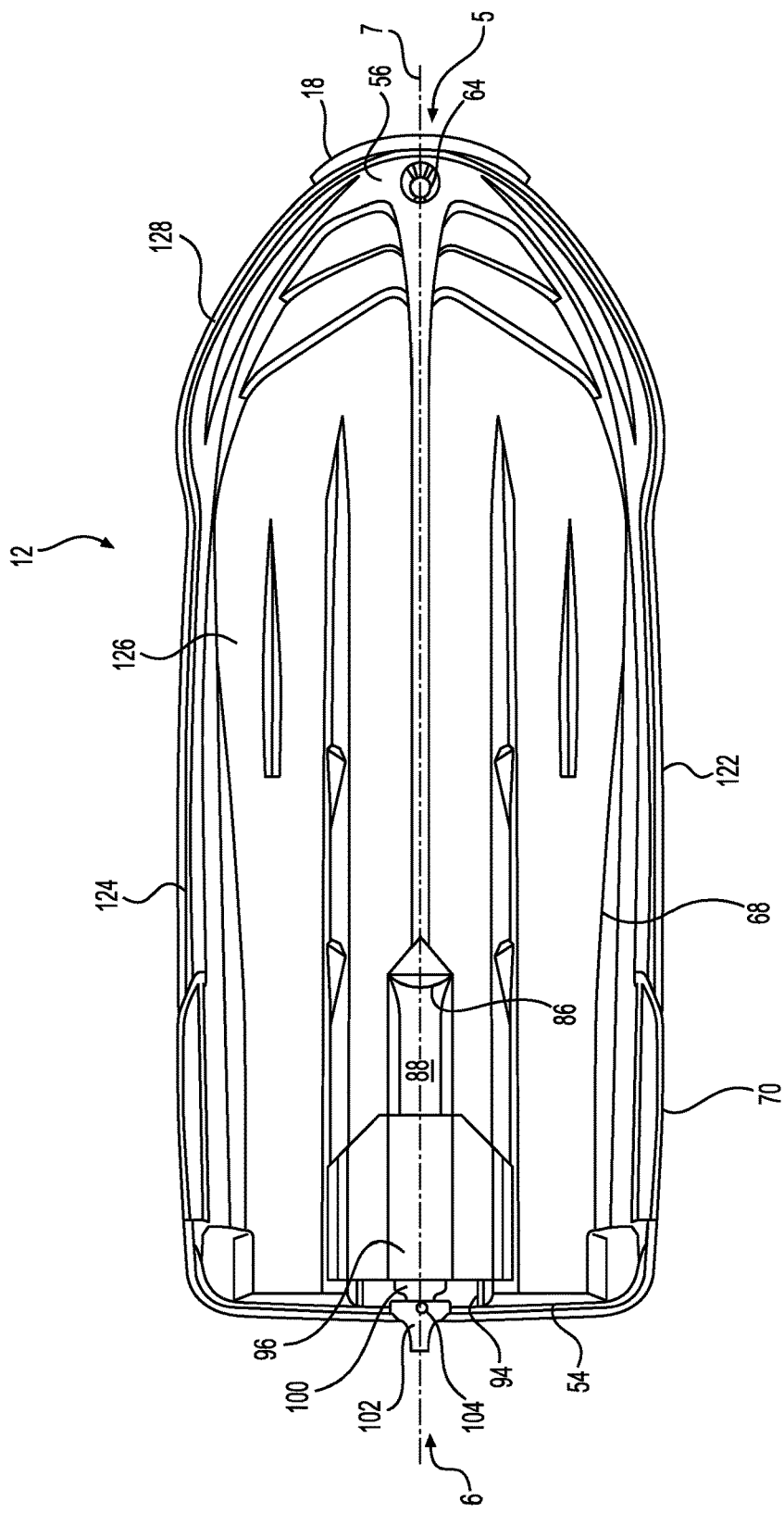
FIG. 1C is a bottom plan view of the PWC of FIG. 1A.
Figure 1D:
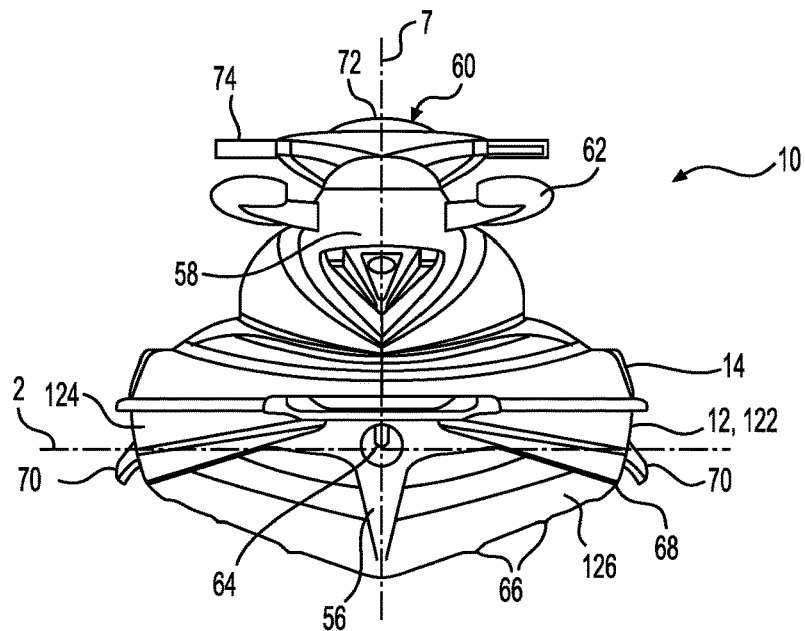
FIG. 1D is a front elevation view of the PWC of FIG. 1A.
Figure 1E:
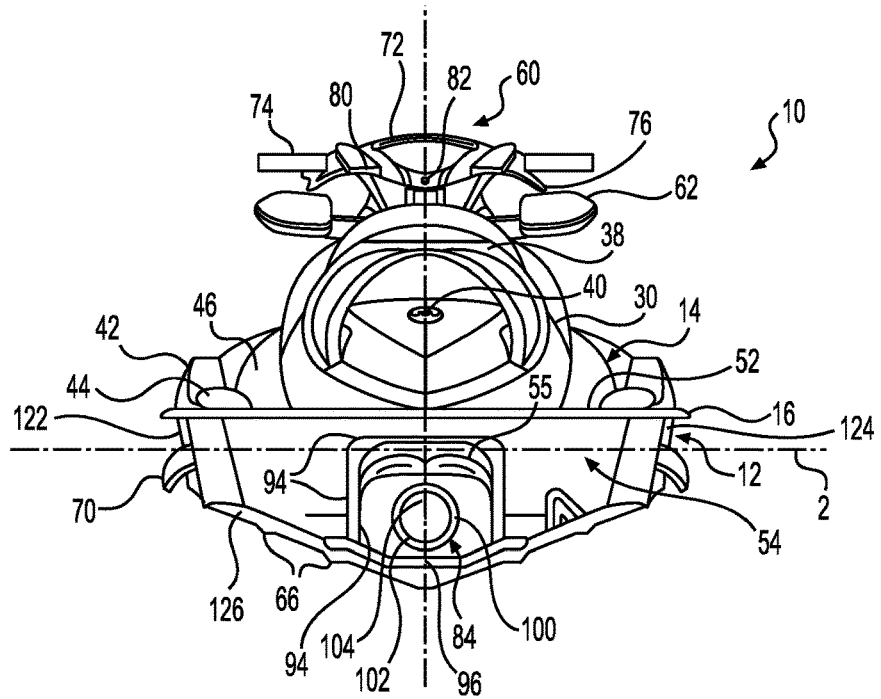
FIG. 1E is a rear elevation view of the PWC of FIG. 1A.

Referring to FIG. 1C, the outer surface of the hull 12 has a hook 64 located at the bow 5 of the PWC 10. The hook 64 can be used to attach the PWC 10 to a dock when the PWC 10 is not in use or to attach to a winch when loading the PWC 10 on a trailer, for instance.

With reference to FIGS. 2 to 7, the hull 12 will now be described in more detail.

The stern end 6 of the hull 12 is defined by a transom 54 that extends generally laterally and vertically. The hull 12 includes a left side portion 122 extending forwardly from a left edge of the transom 54 and a right side portion 124 extending forwardly from a right edge of the transom 54. The left and right side portions 122, 124 each extend generally vertically and longitudinally. At the bow end 5 of the PWC 10, the left side portion 122 curves forwardly and rightwardly (laterally inwardly towards the longitudinal centerplane 7) and the right side portion 124 curves forwardly and leftwardly (laterally inwardly towards the longitudinal centerplane 7). The front ends of the left side portion 122 and the right side portion 124 join together at the longitudinal centerplane 7 to form a generally pointed prow.

Each of the left and right side portions 122, 124 has a sponson 70 disposed near the transom 54. The sponsons 70 give the PWC 10 lift while in motion as well as improved turning characteristics. It is contemplated that the position of the sponsons 70 with respect to the hull 12 may be adjustable to change the handling characteristics of the PWC 10 and accommodate different riding conditions.

The upper portion of the hull 12 is formed as an outwardly extending lip which defines an upper surface 128 of the hull 12. The upper surface 128 extends generally horizontally across the transom 54, and the left and right side portions 122, 124 when the PWC 10 is in dock and unloaded (not carrying any cargo or passengers). In the illustrated implementation, the upper surface 128 of the hull 12 extends continuously around the left side portion 122, the transom 54, and the right side portion 124. It is however contemplated that the hull 12 could have a discontinuous upper surface 128. It is also contemplated that portions of the upper surface 128 could not be horizontal when the PWC 10 is in dock and unloaded. It is contemplated that the upper portion of the hull 12 could not be in the form of a lip in which case the upper surface 128 would be defined by the upper edge of the hull 12.

Figure 4:
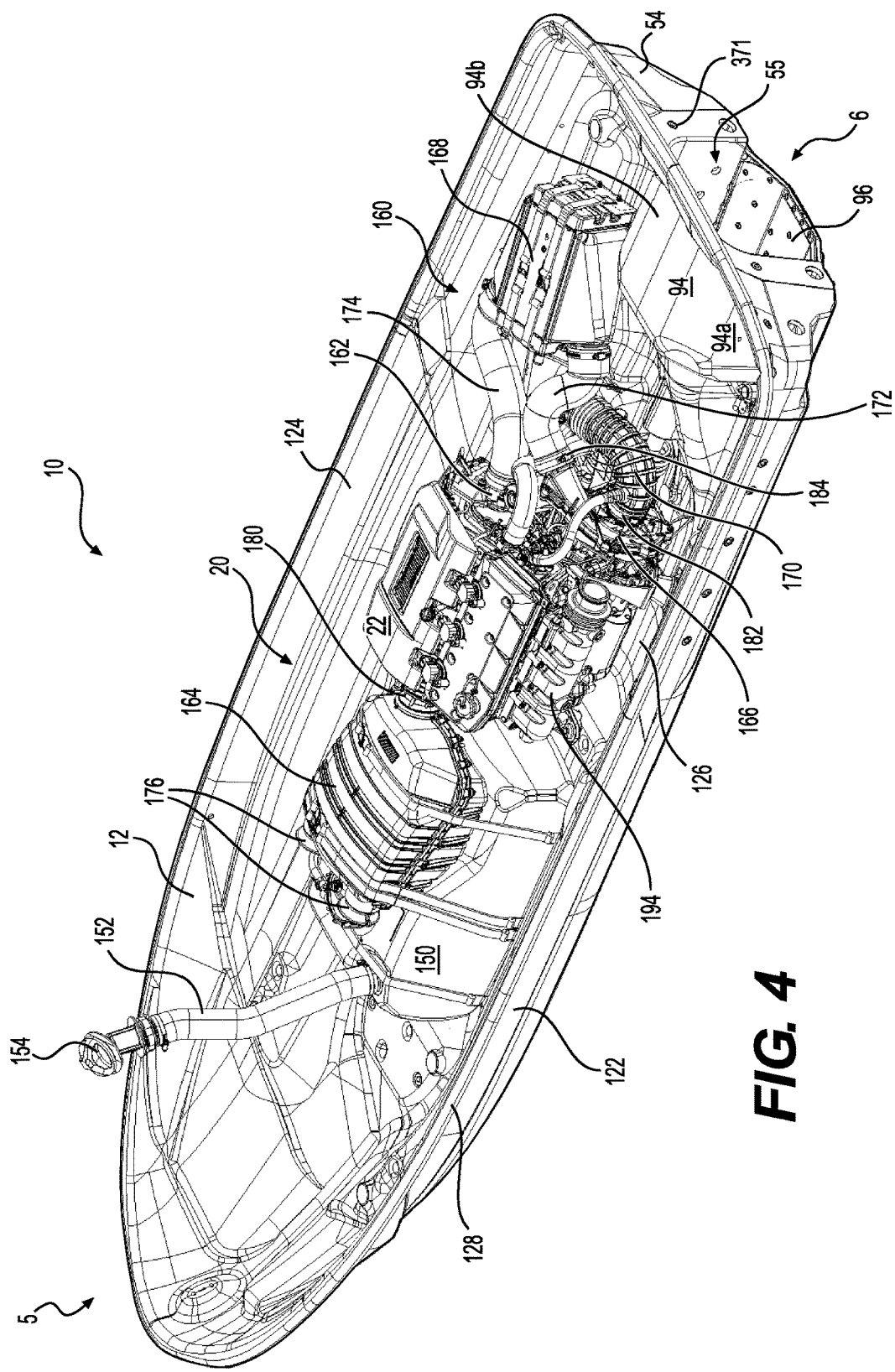
FIG. 4 is a perspective view, taken from a rear, top and left side, of the portion of the PWC of FIG. 2, with an exhaust system of the powerpack being removed for clarity.
Figure 5:
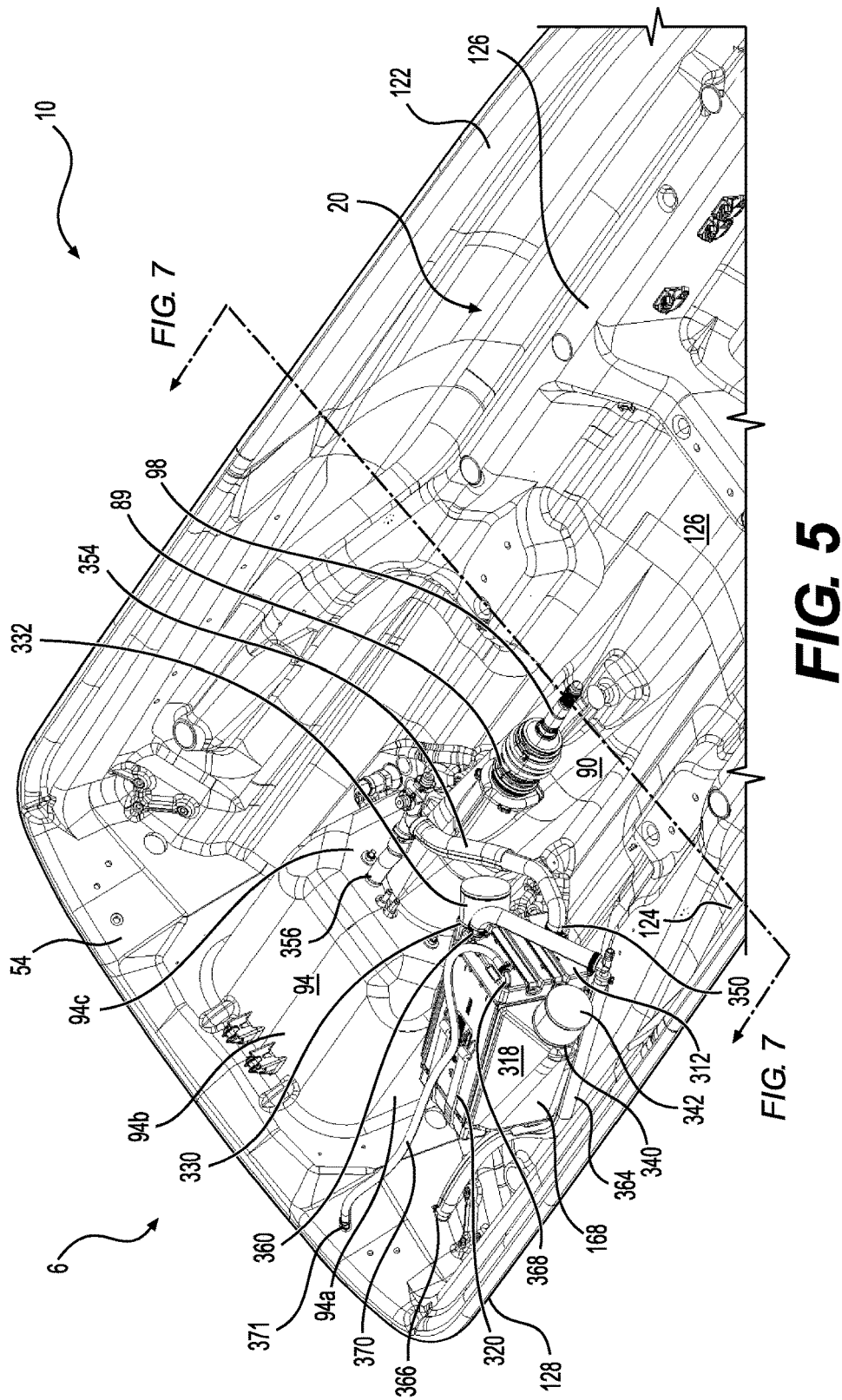
FIG. 5 is a perspective view, taken from a front, top and right side, of a portion of the hull and an intercooler of the powerpack of FIG. 2 showing the water conduits connected to the intercooler.
Figure 6:
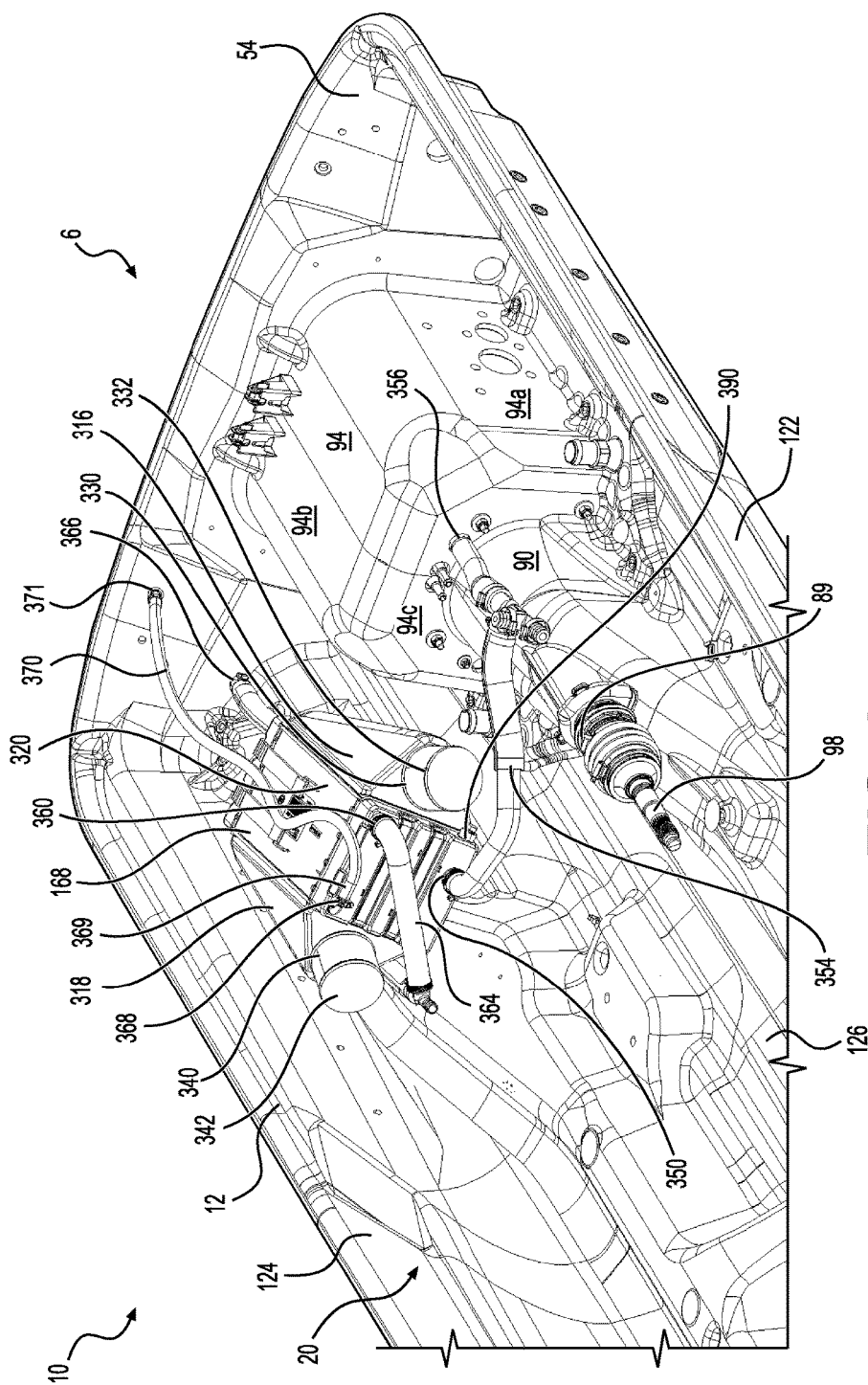
FIG. 6 is a perspective view, taken from a front, top and left side, of the portion of the hull, the intercooler and the water conduits of FIG. 5.

A tunnel 94 extends forwardly from an opening 55 formed in a central portion of the transom 54. The tunnel 94 is disposed between the left and right side portions 122, 124. The tunnel 94 is defined by two generally vertical side walls 94a extending forwardly from the transom 54, and an upper wall 94b extending forwardly from the transom 54 and extending generally horizontally between the side walls 94a. A front wall 94c extends laterally between the front edges of the side walls 94a. The front wall 94c extends vertically downwardly from the front edge of the upper wall 94b to a bottom portion 126 of the hull 12. The bottom of the tunnel 94 is an opening of the hull 12 that is closed by a ride plate 96 as can be seen in FIGS. 1C, 1E and 4. The ride plate 96 creates a running surface on which the PWC 10 rides or planes at high speeds. The jet propulsion system 84 is housed in the tunnel 94 as can be seen in FIG. 1E. The front end of the jet pump 99 is bolted to the front tunnel wall 94c. The steering nozzle 102 pivotably mounted to the rear end of the venturi 100 extends out of the tunnel 94 past the transom 54.

The bottom portion 126 extends forwardly from the bottom edge of the transom 54 and from the tunnel 94. The bottom portion 126 extends laterally between the left and right side portions 122, 124 of the hull 12. The bottom portion 126 forms a V-shape when viewed in cross-section as in FIG. 7 taken along a vertically and laterally extending plane (i.e. a plane perpendicular to the longitudinal centerplane 7).

In the illustrated implementation, the bottom portion 126 has a raised portion 90 extending forwardly from the tunnel 94 along the longitudinal centerplane 7. The raised portion 90, extending forwardly and downwardly from the front wall 94c of the tunnel 94, forms a top portion 90 of a water intake ramp 88. Forward of the tunnel 94, the undersurface of the bottom portion 126 defines a water inlet 86 (FIGS. 1C and 15) with the ride plate 96. The water intake ramp 88 fluidly connects the water inlet 86 to the jet propulsion system 84 disposed in the tunnel 94. A bottom portion 92 of the water intake ramp 88 is formed by a ride shoe (shown schematically in FIG. 1A). Water from under the hull 12 is scooped into the intake ramp 88 through the inlet 86 when the jet pump 99 is operating. The water inlet 86 is covered with an inlet grate (not shown) to prevent large rocks, weeds, and other debris from entering the jet propulsion system 84, which may damage the system or negatively affect performance. In the illustrated implementation, the top portion of the water intake ramp 88 is formed integrally with the bottom portion 126. It is however contemplated that the top portion 90 could be formed separately from the bottom portion 126. It is also contemplated that the raised portion 90 could be omitted and the entirety of the water intake ramp 88 could be disposed under the bottom portion 126. It is further contemplated that the water intake ramp 88 could be formed as a single piece or an insert which could be attached to the jet propulsion system 84. In such cases, the water intake ramp 88 and the jet propulsion system 84 are attached as a unit in a recess in the bottom of hull 12.

A forward facing opening 89 is defined in the top portion 90. The driveshaft 98, extending rearwards from the engine 22, extends through the opening 89 to connect to the jet pump 99 disposed in the tunnel 94. The opening 89, referred to hereinafter as the driveshaft opening 89, is sealed around the driveshaft 98.

With reference to FIGS. 2 to 7, the engine 22 and various components of the powerpack connected thereto will now be described in more detail.

Figure 2:
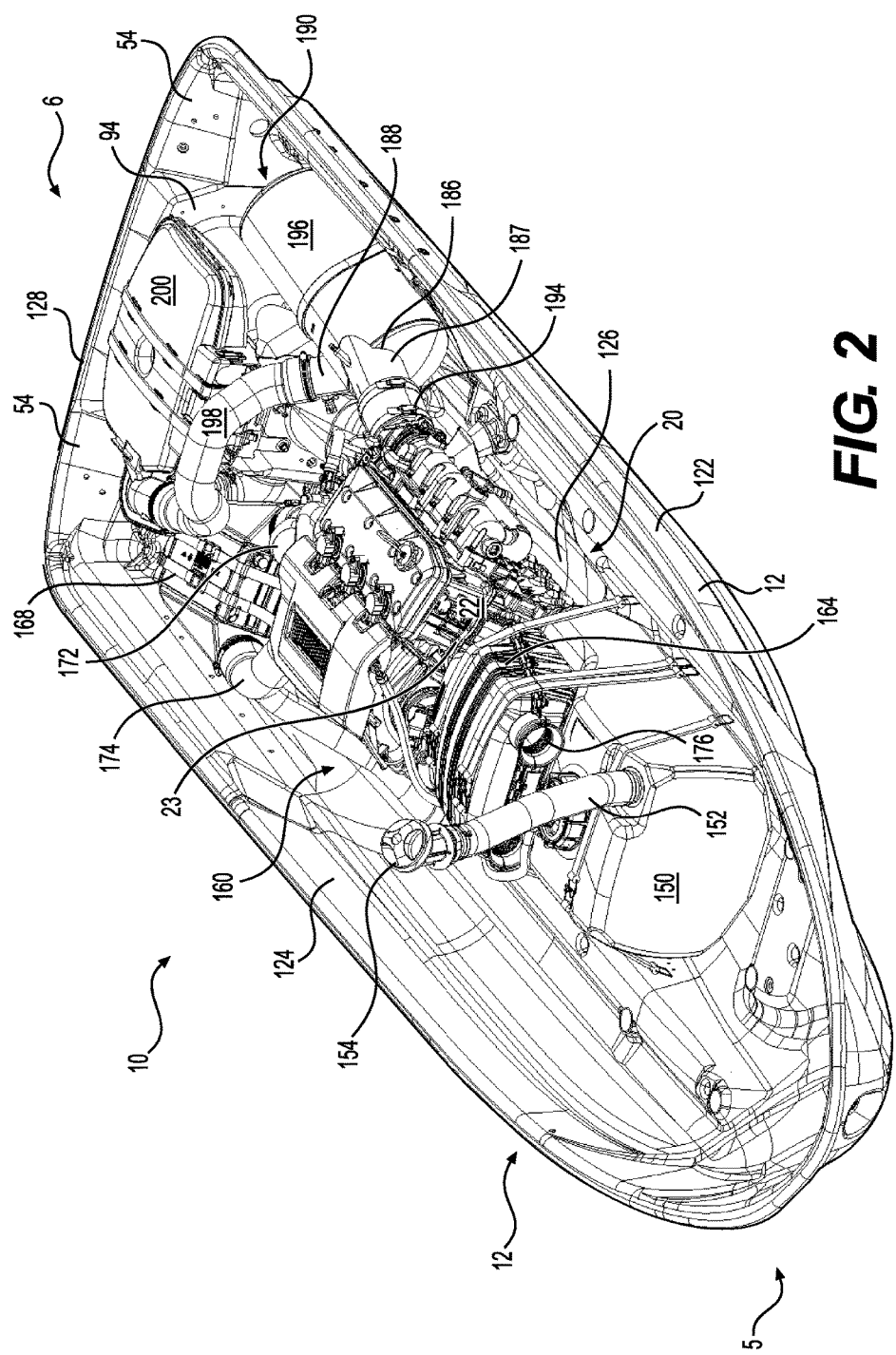
FIG. 2 is a perspective view, taken from a front, top and left side, of a portion of the PWC of FIG. 1A, showing the hull, an engine and other portions of a powerpack disposed inside an engine compartment defined by the hull.
Figure 3:
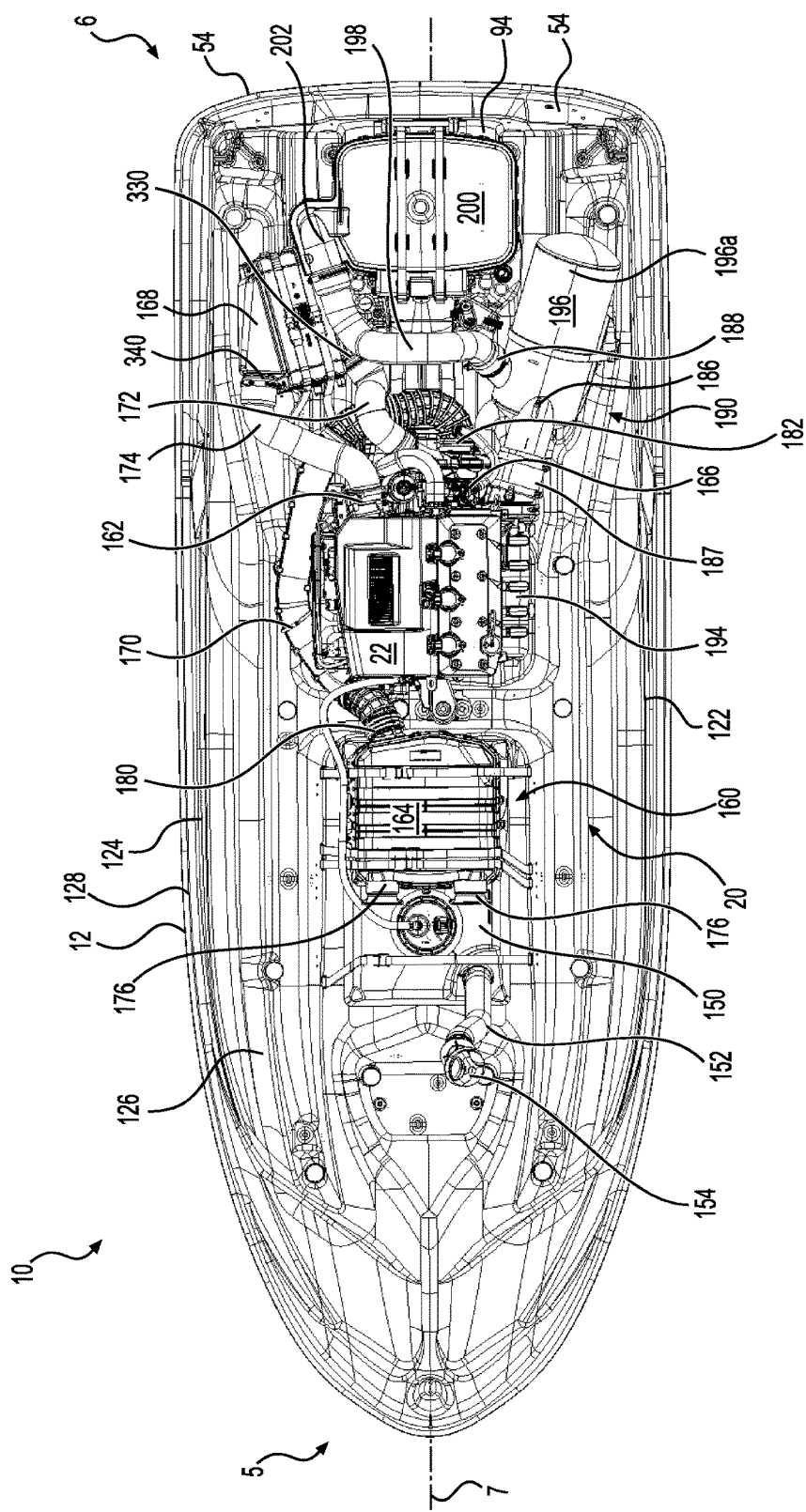
FIG. 3 is a top plan view of the portion of the PWC of FIG. 2.

With reference to FIGS. 2 to 4, the engine 22 is an inline, three-cylinder, four-stroke, internal combustion engine. The three cylinders (not shown) of the engine 22 are oriented with their cylindrical axes (not indicated) disposed parallel to one another and longitudinally spaced from one another. It is contemplated that the engine 22 could be configured differently. For example, the engine 22 could have more or less than three cylinders, and/or the cylinders could be arranged in a V-configuration instead of being inline. It is contemplated that the engine 22 could be a two-stroke internal combustion engine, a carbureted engine, or any other suitable engine capable of propelling the PWC 10. The engine 22 is disposed forward of the tunnel 94 and is supported on the bottom portion 126 of the hull 12. The engine 22 is intersected by the longitudinal centerplane 7, and an output shaft (not shown) of the engine 22 is aligned with the longitudinal centerplane 7.

The engine 22 fluidly communicates with a fuel tank 150 which supplies fuel to the engine 22 for its operation. Each cylinder of the engine 22 is fluidly connected to the fuel tank 150 via a fuel injector. The fuel-air mixture in each cylinder of the engine 22 is ignited by an ignition system. Engine output power, torque and engine speed are determined in part by the ignition timing, and also by various characteristics of the fuel-air mixture such as its composition, temperature, pressure and the like. The fuel tank 150 is disposed on the bottom hull portion 126 and is disposed forward of the engine 22. The longitudinal centerplane 7 intersects the fuel tank 150. A fuel tank fill conduit 152 extends upwards from the fuel tank 150 through the deck 14. The fill conduit 152 has an opening covered by a cap 154 that is disposed above the deck 14 in front of the front seat portion 32 for easy access for refueling.

The engine 22 receives air from an air intake system 160 via an intake manifold 161 (FIG. 3) having an engine air inlet 162. The air inlet 162 is connected to the cylinders of the engine 22 via a throttle body (not shown) of the air intake system 160. The throttle body comprises a throttle valve (not shown) which regulates the amount of air flowing through the throttle body into the corresponding cylinder of the engine 22. An electric motor (not shown) is operatively connected to the throttle valve to change the position of the throttle valve based on input signals received from an electronic control module (not shown) which in turn receives input signals from a position sensor associated with the throttle operator 76 on the handlebars 74. It is contemplated that the throttle valve could be operatively connected to a throttle valve actuator to change the position of the throttle valve with operation of the throttle lever 76 on the handlebar 74.

The air intake system 160 includes an airbox 164, a compressor 166, an intercooler 168, and conduits 170, 172 and 174, in addition to the intake manifold 162 mentioned above. Ambient air enters the airbox 164, and then flows through a conduit 170 into the air compressor 166 which compresses the air. Compressed air from the air compressor 166 is then directed through the conduit 172 into the intercooler 168, and from the intercooler 168 via the conduit 174 and the intake manifold air inlet 162 into the throttle body, and finally into the cylinders of the engine 22.

The airbox 164 is disposed on the upper surface of the fuel tank 150 and supported thereby. Air enters the airbox 164 through two forwardly facing inlets 176 in the front wall of the airbox 164. It is contemplated that the airbox 164 could have a single inlet 176, or more than two inlets 176. The airbox has an outlet 180 defined in a right portion of the rear wall. The conduit 170 connects the outlet 180 to the air compressor 166 disposed rearward of the engine 22. It is contemplated that the airbox inlets 176 and outlet 180 could be configured differently than as shown herein.

From the outlet 180, the conduit 170 extends downwardly and rightwardly. The conduit 170 extends rearwardly along a right side of the engine 22 and then extends leftwardly behind the engine 22. The conduit 170 extends forwardly on a left side of the longitudinal centerplane 7 to connect to a rearward facing air inlet 182 of the compressor 166.

The compressor 166 is disposed on a left side of the longitudinal centerplane 7 and mounted to the rear of the engine 22. It is contemplated that the compressor 166 could be disposed on a right side of the longitudinal centerplane 7. In the illustrated implementation of the PWC 10, the compressor 166 is in the form of a centrifugal supercharger. The supercharger 166 includes a compressor turbine (not shown) driven by a crankshaft (not shown) of the engine 22 via a belt-drive (not shown). It is also contemplated that the compressor 166 could be another form of supercharger, or a turbocharger driven by the exhaust gases expelled by the engine 22. For simplicity, the compressor 166 is referred to hereinafter as supercharger 166 but it should be understood that the present technology is not to be limited to a supercharger-type air compressor. The supercharger 166 has the supercharger air inlet 182 facing rearwardly and being connected to the airbox 166 via the conduit 170 as mentioned above. The supercharger 166 also includes a supercharger air outlet 184 disposed above the supercharger air inlet 182 and facing rightwardly. It is contemplated that the supercharger air inlet 182 and outlet 184 could be configured differently than as shown herein. Due to the compression of the air by the supercharger 166, the compressed air flowing out of the supercharger air outlet 184 is warmer than the air flowing into the supercharger air inlet 182.

The conduit 172 fluidly connects the supercharger air outlet 184 to the intercooler 168. The conduit 172 extends rightwardly and rearwardly from the supercharger air outlet 184, then extends downwardly and then rearwardly and rightwardly to a front facing intercooler air inlet 330 of the intercooler 168.

The intercooler 168 cools the air received from the supercharger 166 before delivering to the intake manifold air inlet 162 via a forward facing intercooler air outlet 340. The intercooler 168 is disposed longitudinally rearward of the engine 22 and supercharger 166, and on a right side of the longitudinal centerplane 7. The intercooler 168 is disposed on a foam member 210 (FIG. 7) and supported thereby on the bottom portion 126 of the hull 12. It is contemplated that the intercooler 168 could not be supported on the foam member 210. For example, the intercooler 168 could be supported by legs instead of the foam member 210. It is also contemplated that the foam member 210 could be omitted and the intercooler 168 could be supported directly on the bottom portion 126. A front portion of the intercooler 168 is disposed longitudinally forward of the tunnel 94 while a rear portion of the intercooler 168 is disposed between the tunnel 94 and the right side portion 124 of the hull 12. It is contemplated that the entire intercooler could be disposed longitudinally forward of the tunnel 94. The intercooler 168 will be described in greater detail below.

The conduit 174 fluidly connects the intercooler air outlet 340 to the intake manifold air inlet 162. The conduit 174 extends forwardly from the intercooler air outlet 340, then leftwardly and forwardly to the intake manifold air inlet 162.

Exhaust gases resulting from the combustion process of each cylinder are expelled from the engine 22 via the exhaust system 190. An exhaust port 192 (FIG. 16) is defined in the left side of each cylinder of the engine 22. The exhaust system 190 includes an exhaust manifold 194 which is connected to the exhaust ports 192 of the cylinders to direct exhaust gases out of the engine 22. An inlet pipe 187 extends rearwardly and leftwardly from the exhaust manifold 194 to fluidly connect to an inlet 186 defined in the front facing surface of a muffler 196. The cylindrical muffler 196 is disposed longitudinally rearward of the engine 22 on a left side of the longitudinal centerplane 7. The muffler 196 is cylindrical and disposed with its central cylindrical axis 196a (FIG. 3) extending generally horizontally at an angle to the longitudinal centerplane 7. An outlet 188 is defined in the rightward facing cylindrical surface of the muffler 196 in a front portion thereof. It is contemplated that the muffler inlet 186 and outlet 188 could be configured differently than as shown herein and/or that the muffler 196 could be disposed in an orientation other than that illustrated herein.

An exhaust conduit 198 connects the muffler outlet 188 to a resonator 200 disposed on the upper surface 94b of the tunnel 94. The resonator 200, in the shape of a generally rectangular box, has an opening 202 defined on its right side. The exhaust conduit 198 fluidly connects the muffler outlet 188 to the opening 202. The muffler 196 and the resonator 200 reduce noise generated by the engine 22 during its operation. From the exhaust conduit 198, the exhaust gases are directed out of the engine compartment 20 via an opening in the tunnel 94.

The intercooler 168 will now be described in more detail with reference to FIGS. 7 to 16.

The intercooler 168 has a housing 300 and an intercooler core 302 enclosed within the housing 300. The housing 300 also includes an intercooler air inlet 330, and intercooler air outlet 340, a water inlet 350, a water outlet 360, an air bleed outlet 368 and an anode opening 380.

The housing 300 includes a lower surface 310, an upper surface 320, a front surface 312, a rear surface 314, a left side surface 316 and a right side surface 318. It should be understood that the terms "lower", "upper", "front", "rear", "right side" and "left side" when describing the surfaces of the intercooler 168 refer to the corresponding positions of the surfaces when the intercooler 168 is mounted in the PWC 10, and are being used only for convenience to distinguish the surfaces from one another.

The upper and lower surfaces 310, 320 are generally planar and disposed parallel to each other. The front surface 312 extends from a front edge of the upper surface 320 to a front edge of the lower surface 310. The rear surface 314 extends from a rear edge of the upper surface 320 to a rear edge of the lower surface 310. The front and rear surfaces 312, 314 extend generally parallel to each other and are each perpendicular to the upper and lower surfaces 310, 320.

The left side surface 316 extends from the front surface 312 to the rear surface 314 and from the upper surface 320 to the lower surface 310. The left side surface 316 has a planar front end portion 336 disposed adjacent the front surface 312 and a planar rear end portion 338 disposed adjacent the rear surface 314. The planar end portions 336, 338 extend perpendicular to the upper and lower surfaces 310, 320 and front and rear surfaces 312, 314. A front central portion 337 of the left side surface 316 extends rearwardly and leftwardly from the front end portion 336 to a rear central portion 339. The rear central portion 339 extends downwardly and leftwardly away from the left edge of the upper surface 320 and then downwardly and rightwardly to the left edge of the lower surface 310. When viewed from the top as in FIG. 10, the rear central portion 339 extends rearwardly and rightwardly from the front central portion 337 towards the rear end portion 338. When viewed from the top as in FIG. 10, a rear end of the rear central portion 339 extends rightwardly (i.e. perpendicularly to the rear end portion 338) to connect to the rear end portion 338.

The intercooler air inlet 330 is defined in the front central portion 337 of the left side surface 316. The intercooler air inlet 330 thus faces forwardly and leftwardly away from the rear surface 314. The intercooler air inlet 330 has a central intercooler air inlet axis 335 (axis 335 extends normal to the intercooler air inlet 330) which is disposed at a non-perpendicular angle to the front and rear surfaces 312, 314 as can be seen in FIG. 10. The rear central portion 339 defines an intercooler air inlet passage 331 (FIG. 12) inside the housing 300 that directs air from the intercooler air inlet 330 to the intercooler core 302. The intercooler core 302 will be described in further detail below. A cylindrical intercooler air inlet pipe 332 is connected to the left side surface 316 around the circular intercooler air inlet 330. The central intercooler air inlet axis 335 also forms a central axis of the cylindrical intercooler air inlet pipe 332. The intercooler air inlet pipe 332 is connected to the conduit 172 for fluidly connecting the supercharger air outlet 184 to the intercooler air inlet 330. It is contemplated that the intercooler air inlet pipe 332 could be tubular but not cylindrical and that the central axis of the intercooler air inlet pipe 332 could be curved instead of a straight line as shown herein.

The right side surface 318 extends from the front surface 312 to the rear surface 314 and from the upper surface 320 to the lower surface 310. The right side surface 318 has a planar front end portion 346 disposed adjacent the front surface 312 and a planar rear end portion 348 disposed adjacent the rear surface 314. The planar end portions 346, 348 extend perpendicular to the upper and lower surfaces 310, 320 and front and rear surfaces 312, 314. A front central portion 347 of the right side surface 318 extends rearwardly and rightwardly from the front end portion 346 to a rear central portion 349. The rear central portion 349 of the right side surface 318 extends downwardly and rightwardly away from the right edge of the upper surface 320 and then downwardly and leftwardly to the right edge of the lower surface 310. When viewed from the top as in FIG. 10, the rear central portion 349 extends rearwardly and leftwardly from the front central portion 347 towards the rear end portion 348. When viewed from the top as in FIG. 10, a rear end of the rear central portion 349 extends leftwardly (i.e. perpendicularly to the rear end portion 348) to connect to the rear end portion 348.

The intercooler air outlet 340 is defined in the front central portion 347 of the right side surface 318. The intercooler air outlet 340 thus faces forwardly and rightwardly away from the rear surface 314. The intercooler air outlet 340 has a central intercooler air outlet axis 345 (axis 345 extends normal to the intercooler air outlet 340) that extends at a non-perpendicular angle to the front and rear surfaces 312, 314 as can be seen in FIG. 10. Although not shown, similar to the air inlet passage 331 defined by the left side surface 316, the rear central portion 349 defines an intercooler air outlet passage inside the housing 300 that directs air from the intercooler core 302 to the intercooler air outlet 340. A cylindrical intercooler air outlet pipe 342 is connected to the front central portion 347 of the right side surface 318 around the circular intercooler air outlet 340. The central intercooler air outlet axis 345 also forms a central axis of the cylindrical intercooler air outlet pipe 342. The intercooler air outlet pipe 342 is connected to the conduit 174 for fluidly connecting the intercooler air outlet 340 to the engine air inlet 162. It is contemplated that the intercooler air outlet pipe 342 could be tubular but not cylindrical and that the central axis of the intercooler air outlet pipe 342 could be curved instead of a straight line as shown herein.

The intercooler air inlet axis 335 is disposed at an acute angle with respect to the intercooler air outlet axis 345 as can be seen in FIG. 10. An intercooler plane 305 containing the intercooler air inlet and outlet axes, 335 and 345, extends parallel to the upper and lower surfaces 310, 320. The intercooler plane 305 is disposed midway between the upper and lower surfaces as can be seen in FIG. 9.

The water inlet 350 is defined in the front surface 312 just above the lower surface 310 and disposed closer to the left side surface 316 than the right side surface 318. The water inlet 350 is smaller in diameter than the intercooler air inlet and outlet 330, 340. A cylindrical water inlet pipe 352 extends outwards from the front surface 312 around the water inlet 350. A water conduit 354 (FIG. 6) is connected to the water inlet pipe 352 to fluidly connect the water inlet 350 to the jet pump 99. The water conduit 354 extends from the water inlet pipe 352 to an opening 356 defined in the front wall 94c of the tunnel 94. The opening 356 is fluidly connects to a passage (not shown) in an upper portion of the jet pump 99.

The water outlet 360 is defined in the front surface 312 just below the upper surface 320. The water outlet 360 is disposed in an upper left corner of the front surface 312. The water outlet 360 is smaller in diameter than the intercooler air inlet and outlet 330, 340. A cylindrical water outlet pipe 362 extends outwards from the front surface 312 around the water outlet 360. A water conduit 364 (FIG. 6) is connected to the water outlet pipe 362 for fluidly connecting the water outlet 360 to an exterior of the engine compartment 20. The water conduit 364 extends from the water outlet pipe 362 to an opening 366 (FIG. 5) defined in the transom 54 on a right side of the tunnel 94. The water conduit 364 thus extends downwardly and rightwardly in front of the intercooler 168 and then rearwardly on a right side of the intercooler 168 to the opening 366.

Figure 12:
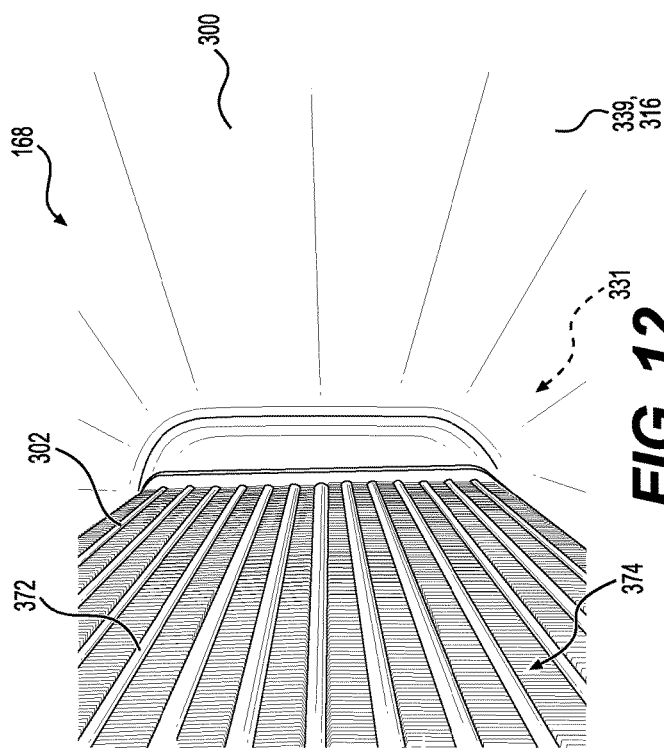
FIG. 12 is a perspective view, taken from a front and right side, of a portion of the intercooler core of FIG. 8 and showing an interior of the right side portion of the housing.
Figure 11:
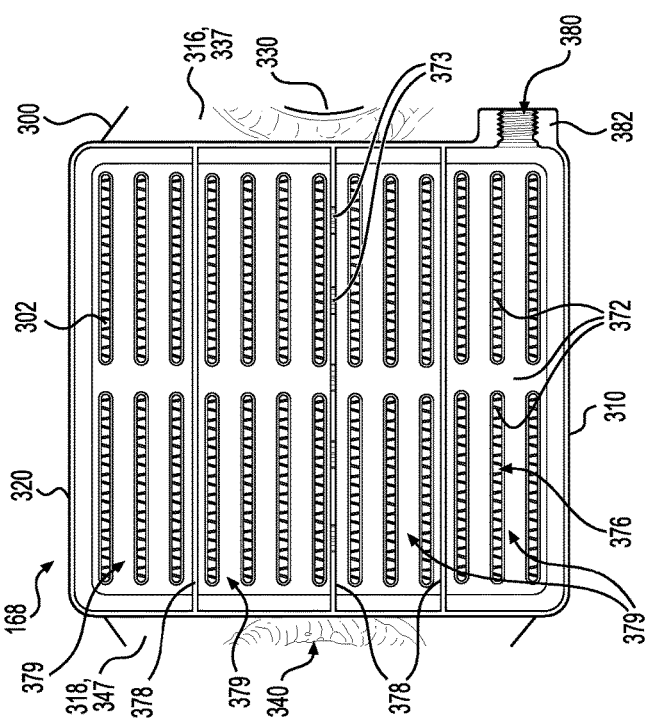
FIG. 11 is a front elevation view of a portion of the intercooler of FIG. 8 with a front surface of a housing of the intercooler removed to show a portion of an intercooler core.

With reference to FIGS. 11 and 12, the intercooler core 302 is housed within a space enclosed by the surfaces 310, 312, 314, 316, 318, 320. The intercooler core 302 includes a plurality of walls 372 defining air channels 374 and water channels 376. The air and water channels 374 and 376 extend parallel to the intercooler plane 305. The water channels 376 extend parallel to the upper and lower surfaces 320, 310 in a direction perpendicular to the front and rear surfaces 312, 314. The air channels 374 extend parallel to the upper and lower surfaces 320, 310 in a direction parallel to the front and rear surfaces 312, 314. The air channels 374 thus extend perpendicular to the water channels 376. It is contemplated that the water channels 376 could be disposed parallel, or at another non-perpendicular angle, to the air channel 374. The air channels 374 and the water channels 376 are defined by the diathermal walls 372 which allow heat transfer between air flowing through the air channels 374 and water flowing through the water channels 376 without allowing mixing of the two and thereby preventing entry of water into the combustion chamber of the engine 22. The diathermal walls 372 of the intercooler core 302 are metallic to increase efficiency of heat transfer from the air channels 374 to the water channels 376. In the illustrated implementation, the walls 372 are made of an aluminum alloy, but it is contemplated that the walls 372 could be made of any suitably heat conducting material, such as copper, an alloy of copper and/or aluminum, and the like.

With reference to FIG. 11, in the illustrated implementation, the housing 300 also includes three front separation walls 378 that divide the space between the core 302 and the front wall that forms the surface 312 into four front chambers 379 arranged in a vertical array. For simplicity, the four front chambers 379 will be referred to as the first, second, third and fourth front chamber, respectively, in order from the lowest to the highest. The second front chamber 379 is fluidly connected to the third front chamber 379 by five apertures 373 formed in the separation wall 379 between the second and third front chambers 379. Although not shown, the housing 300 similarly includes three rear separation walls that divide the space between the intercooler core 302 and the rear wall forming the rear surface 314 into four rear chambers arranged in a vertical array. The rear chambers (not shown) are configured similarly in size and shape as the front chambers 379. Similarly to the front chambers 379, the four rear chambers will be referred to herein as the first, second, third and fourth rear chamber, respectively, in order from the lowest to the highest. The first rear chamber is fluidly connected to the adjacent second rear chamber by apertures formed in the rear separation wall therebetween. Similarly, the fourth rear chamber is fluidly connected to the adjacent third rear chamber by apertures formed in the rear separation wall therebetween. Each of the front chambers 379 is fluidly connected to a corresponding one of the rear chambers by a corresponding set of water channels 376. Cooling water enters the first front chamber 379 via the water inlet 350 and flows generally rearwardly to the first rear chamber 379 through the set of water channels 376 associated therewith. From the first rear chamber, the water flows upwards into the second rear chamber through the apertures of the rear separation wall therebetween, and then forwardly to the second front chamber 379 via the corresponding set of water channels 376. This process is repeated as the water crosses back and forth across the core 302, flowing generally longitudinally in the water channels 376, and upwards between chambers before exiting via the water outlet 360.

Compressed air from the supercharger 166 flows via the air inlet pipe 332, the air inlet 330, and the air inlet passage 331 into the intercooler air channels 374. After flowing through the air channels 374, where the air is cooled by diathermal contact with the water flowing in the water channels 376, the cooled air flows out via the air outlet passage (not shown), the air outlet 340 and the air outlet pipe 342 into the engine 22.

When the PWC 10 is operating (i.e. when the engine 22 and the jet propulsion system 84 are operational), the jet pump 99 pumps lake or sea water from outside the engine compartment 20 via the intake ramp 88 and then supplies water via the opening 356, the water conduit 354, the water inlet pipe 352 and the water inlet 350 into the water channels 376 of the intercooler 168. After flowing through the water channels 376 where the water becomes warmer by absorbing heat from the air flowing in the diathermally connected air channels 374, water flows out of the intercooler 168 via the water outlet 360, water outlet pipe 362, water conduit 364 and opening 366 to the exterior of the engine compartment 20. The water flowing out of the water outlet 360 is thus warmer than the water flowing into the water inlet 350 when the PWC 10 is operating.

The air bleed outlet 368 defined in the upper right corner of the front surface 312 is fluidly connected to the water channels 376 in the topmost chamber 379. A tubular air bleed pipe 369 is connected to the front surface 312 around the air bleed outlet 368. An air bleed conduit 370 (FIG. 5) is connected to the air bleed pipe 369 to fluidly connect the air bleed outlet 368 to an exterior of the engine compartment 20 via an opening 371 defined in the transom 54 on a right side of the tunnel 94 just below the upper surface 128 of the transom 54. The air bleed outlet 368 allow any air within the water channels 376 to escape once the engine 22 and jet pump 99 have been turned on and the water channels 376 begin to fill with water.

When the PWC 10 is docked (i.e. the engine 22 and the jet propulsion system 84 are not operational), water is no longer pumped into the intercooler 168 by the jet pump 99. When the jet pump 99 stops pumping water into the intercooler 168, water drains out of the intercooler 168 via the water inlet 350 and the water outlet 360 until the water channels 376 of the intercooler 168 disposed vertically above the water line 2 (FIG. 7) are empty of water. The water channels 376 that are disposed vertically below the water line 2 remain filled with water.

Figure 16:
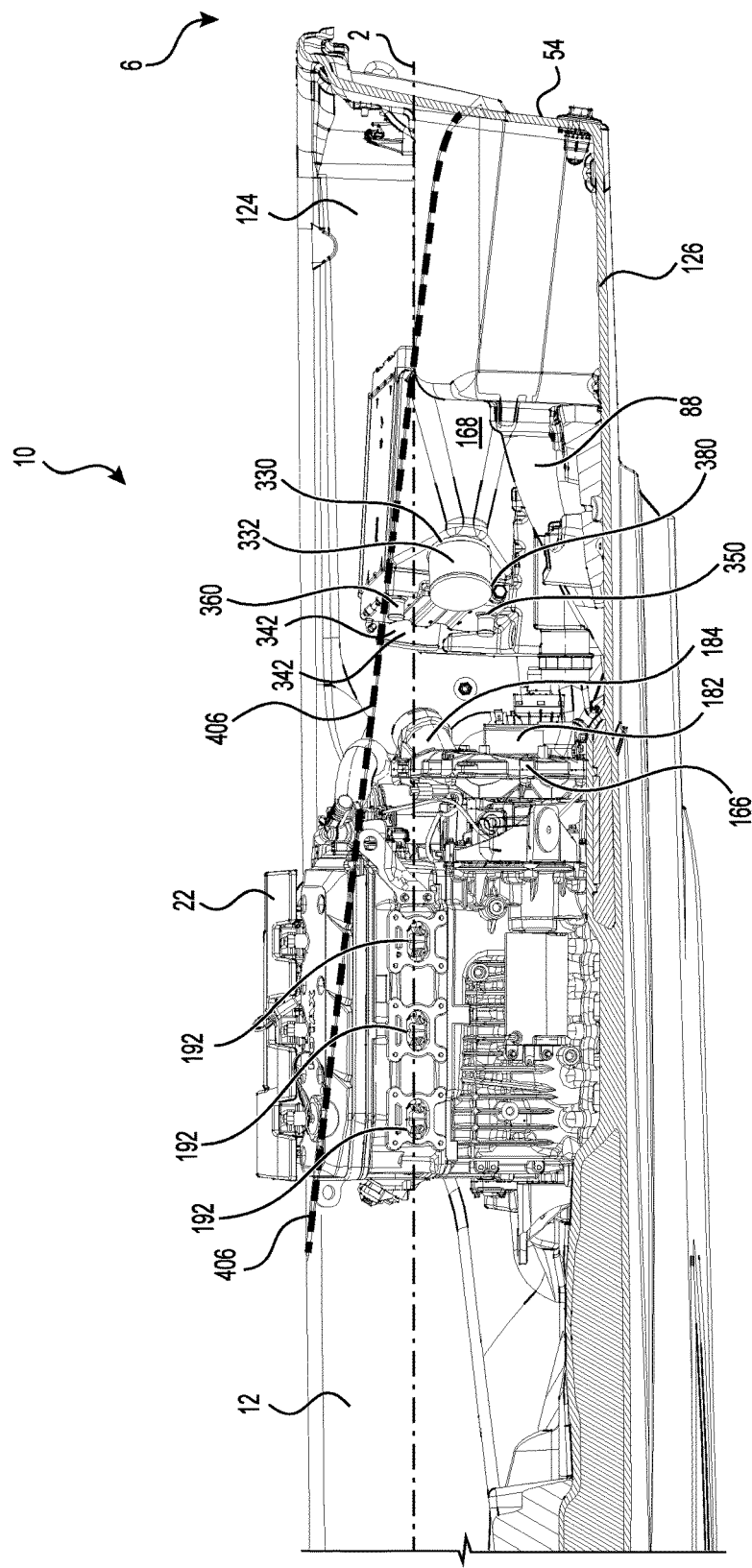
FIG. 16 is a cross-sectional view, taken along the longitudinal centerplane, of the hull, engine and intercooler of FIG. 2 showing an intersection of the intercooler plane with a right side portion of the hull.

The anode opening 380 is defined in the lower portion of the intercooler 168. In the illustrated implementation, the anode opening 380 is defined in the left side surface 316 in the lower portion of the front end portion 336 near the lower surface 310. The anode opening 380 is thus disposed below the water line 2 as can be seen in FIG. 16. The anode opening 380 is defined in a boss 382 and is internally threaded as can be seen best in FIG. 11.

Figure 13:
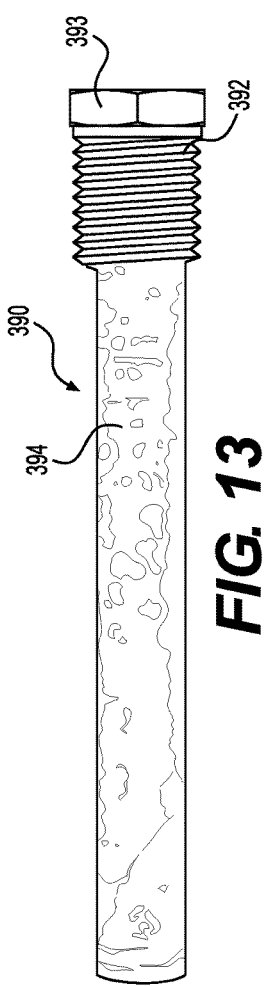
FIG. 13 is a front elevation view of an anode member of the intercooler of FIG. 8 shown in isolation.

With reference to FIG. 13, a cylindrical anode member 390 is inserted in the anode opening 380. The anode member 390 comprises a cylindrical holder 392 and an anode 394. The cylindrical holder 392 is threaded on its external surface. One end of the holder 392 has a hexagonal head 393 by which the holder 392 is held for installation and removal from the intercooler 168. The anode 394 is cylindrical and mounted to the holder 392 at the end opposite the hexagonal head 393. The anode 394 extends outwardly from the end of the holder 392 opposite the hexagonal head 393. The threaded cylindrical holder 392 is inserted through the anode opening 380 and threadedly fastened to the housing 300 by the internally threaded boss 382.

The anode 394 extends from the holder 392 into the lowest of the chambers 379 (first chamber 379) which is disposed below the water line 2. Since the lowest chamber 379 is disposed below the water line 2, the anode 394 will remain submerged even when the jet pump 99 is turned off and the PWC 10 is docked. The anode 394 is provided to reduce corrosion in the intercooler core 302. The anode 394 is made of a highly electrochemically active element such as zinc, and thereby protects from corrosion other components (such as the walls 372) of the intercooler core 302 that are less electrochemically active, conductively connected to the anode 394, and fluidly connected to the water that the anode 394 is in contact with. The anode 394 protects the walls 372 of the intercooler core 302 from corrosion due the water in the water channels 376 of the intercooler 168.

It has also been noted that repeatedly filling and emptying an intercooler can increase certain forms of corrosion, in particular "pitting". Accordingly, corrosion can be reduced when the intercooler water channels 376 are left filled with water while the PWC 10 is docked compared to the amount of corrosion when the water is drained out of the intercooler 168 when the PWC 10 is docked and the jet pump 99 is turned off. As mentioned above, when the jet pump 99 stops pumping water into the intercooler 168, the water in the water channels 376 disposed vertically below the water line 2 remain in the intercooler 168. The intercooler 168 is therefore mounted in the PWC 10 such that a majority of the water channels 376 remain below the water line 2 and filled with water when the engine 22 is turned off, the PWC 10 is carrying no load (passengers or cargo) and the PWC 10 is in level water. In the illustrated implementation, 56% of the water channels 376 of the intercooler 168 remain filled with water when the engine 22 is not turned off and the PWC 10 is not carrying any load. It is contemplated that the fractional portion of the water channels 376 remaining filled with water when the engine 22 is turned off and the PWC 10 carrying no load could be more or less than 56%.

The positioning of the intercooler 168 in the engine compartment 20 to ensure that a majority of the water channels 376 remain filled with water will now be described with reference to FIGS. 7, and 14 to 16.

The intercooler 168 is disposed laterally on the right side of the tunnel 94 with the intercooler air inlet 330 being spaced from intercooler air outlet 340 in a lateral direction of the PWC 10.

Figure 7:
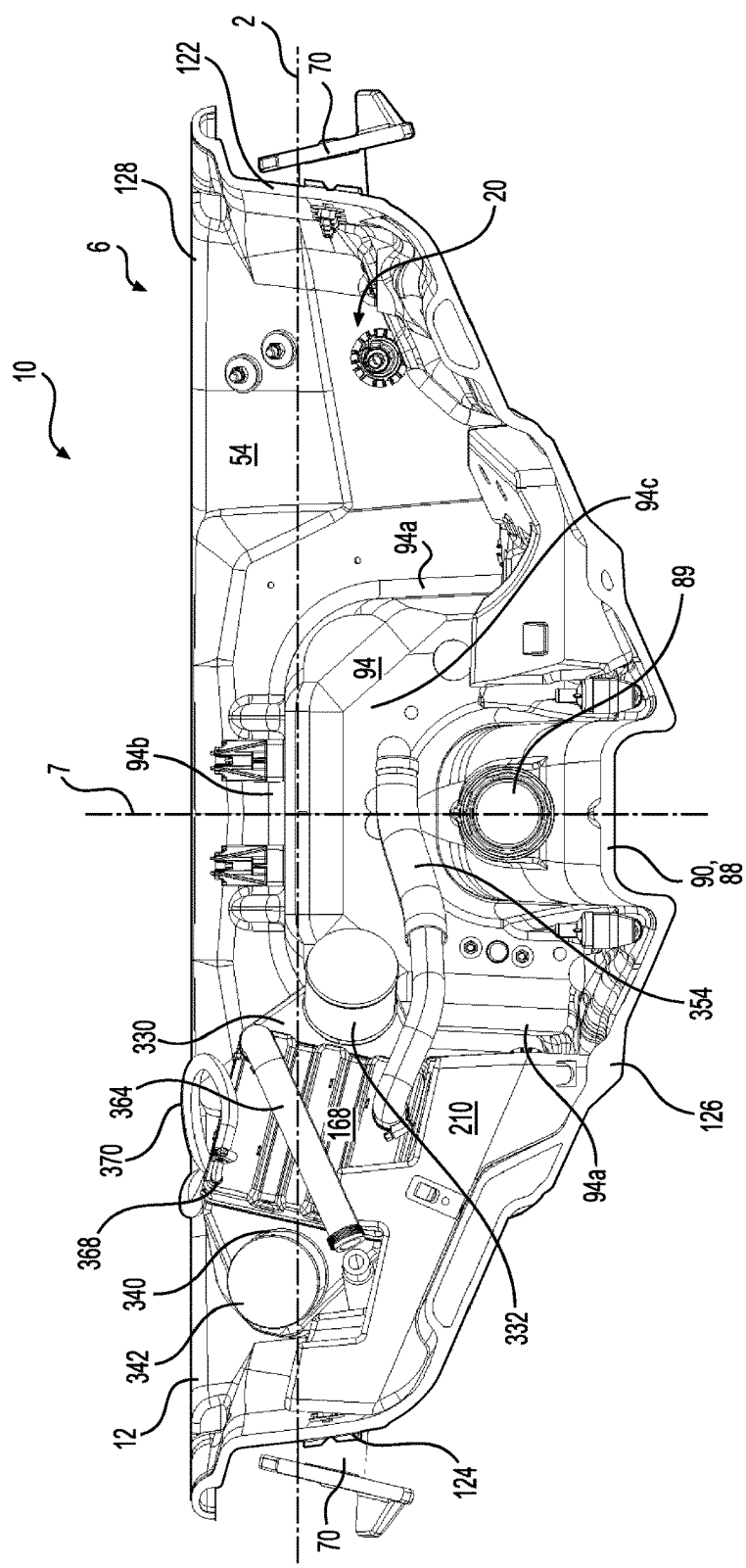
FIG. 7 is a cross-sectional view of the hull showing the intercooler and water conduits of FIG. 5 taken along the line 7-7 of FIG. 5 with the driveshaft being removed and including a foam member.
Figure 8:
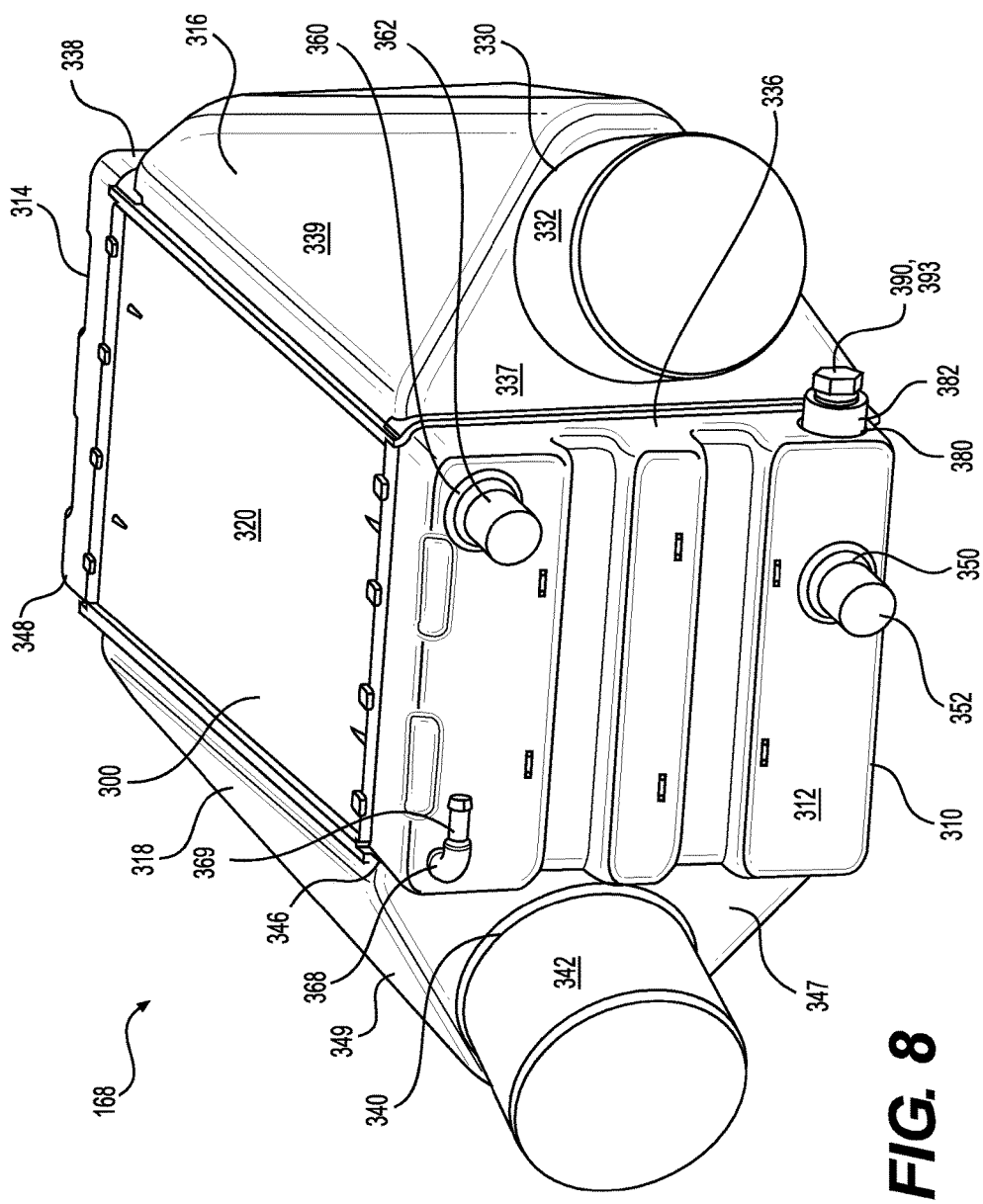
FIG. 8 is a perspective view taken from a front, top and left side, of the intercooler of FIG. 5 shown in isolation.

With reference to FIG. 7, the lower surface 310 of the intercooler 168 extends along the V-shaped bottom portion 126 of the hull 12. In the illustrated implementation, the lower surface 310 is disposed close to the bottom portion 126 but not in contact therewith. The lower surface 310 is separated from the bottom portion 126 by the foam member 210 which supports the intercooler 168 on the bottom portion 126 of the hull 12. It is also contemplated that the intercooler 168 could be on the bottom portion 126 so that the lower surface 310 is directly in contact with the bottom portion 126.

The planar lower surface 310 extends generally parallel to the portion of the bottom portion 126 disposed thereunder, although the lower surface 310 is not exactly parallel to portion of the bottom portion 126. Rather, the lower surface 310 is disposed at an acute angle with respect to the right side of the V-shaped bottom portion 126. Since the intercooler plane 305 is disposed between the lower and upper surfaces 310, 320, and extends generally parallel to the lower surface 310, the intercooler plane 305 is also disposed generally parallel to the portion of the bottom portion 126 disposed under the intercooler 168. Both of the intercooler plane 305 and the lower surface 310 are disposed so as to be generally flat rather than generally upright relative to the portion of the bottom portion 126 disposed under the intercooler 168. The lower surface 310 and the intercooler plane 305 are disposed at a smaller angle with respect to the portion of the bottom portion 126 disposed below the intercooler 168 than with respect to any one of the left side portion 122, the right side portion 124 and the transom 54.

The upper surface 320 of the intercooler 168 is disposed entirely below the upper surface 128 of the hull 12. Thus, the upper surface 128 of the hull 12 is disposed above all of the water channels 376 of the intercooler 168. The upper wall 95b of the tunnel 94 is disposed vertically higher than a majority of the water channels 376 of the intercooler core 302.

Figure 14:
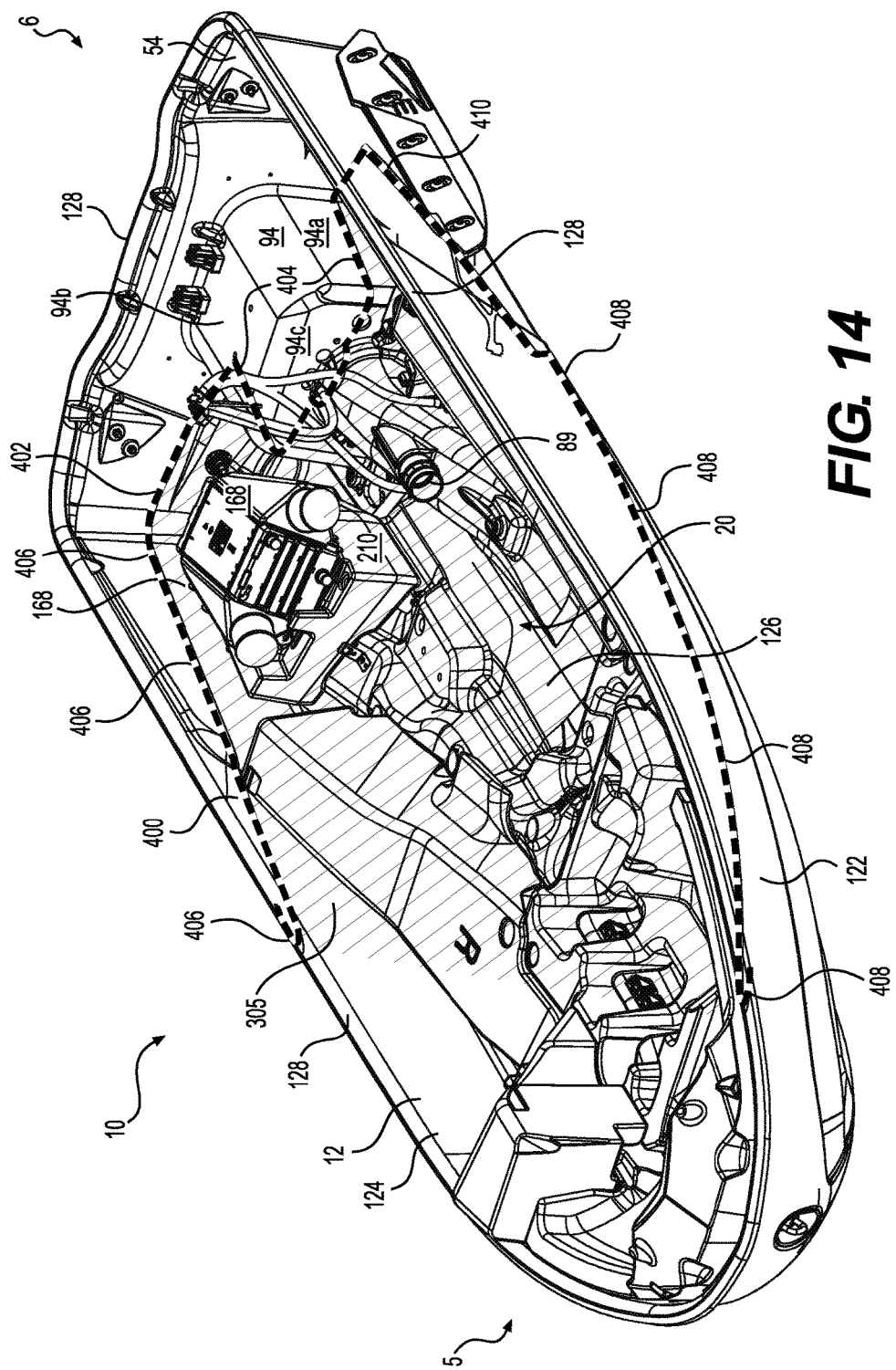
FIG. 14 is a perspective view, taken from a front, top and left side, of the hull and the intercooler of FIG. 2 and showing an intercooler plane.

With reference to FIG. 14, the intercooler 168 is disposed such that the intercooler plane 305 intersects the transom 54, the tunnel 94, and the left and right side portions 122, 124 of the hull 12. The intersection of the plane 305 with the hull 12 is generally shown as 400.

Figure 15:
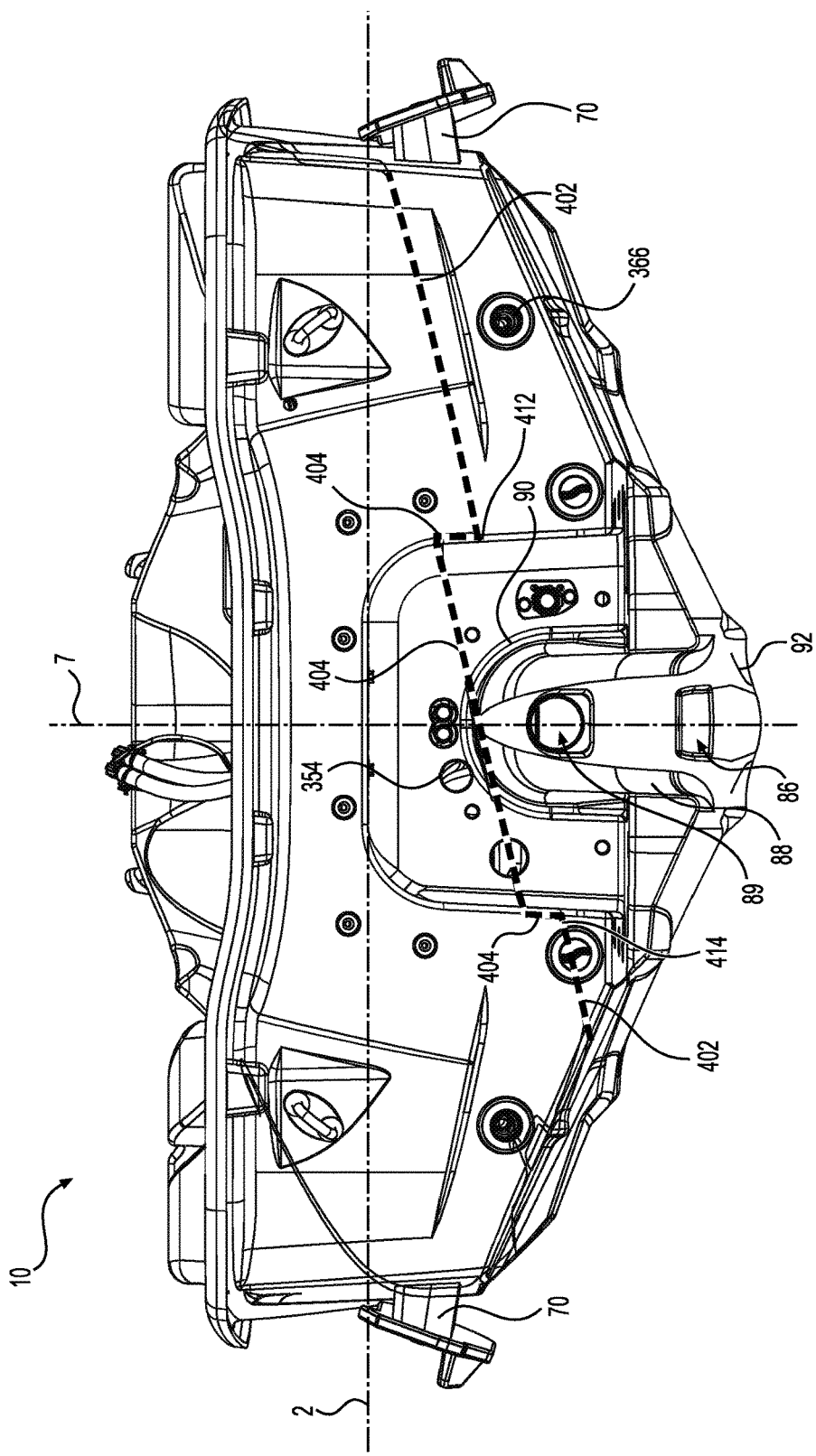
FIG. 15 is a rear elevation view of the hull of FIG. 14 showing an intersection of the intercooler plane with a transom and a tunnel of the hull.

With reference to FIGS. 14 and 15, the intercooler plane 305 forms a transom intersection 402 with the transom 54 which is entirely disposed below the upper surface 128 of the transom 54. The entirety of the transom intersection 402 is also disposed vertically lower than the upper tunnel wall 94a. At the right edge of the transom 54 (where the transom 54 connects to the right side portion 124), the transom intersection 402 is disposed vertically above the top portion 90 of the intake ramp 88. When viewed from a rear as in FIG. 15, the transom intersection 402 is angled downwardly and leftwardly and disposed generally parallel to the right side of the bottom portion 126. The transom intersection 402 is disposed above the bottom edge of the transom 54 (where the transom intersects the bottom portion) on the right side of the tunnel 94, and on the left side of the tunnel 94, the transom intersection 402 passes through the bottom edge of the transom 54. The intersection 412 of the right side wall 94a of the tunnel 94 and the transom intersection 402 is disposed above the driveshaft opening 89. The intersection 414 of the left side wall 94a of the tunnel 94 and the transom intersection 402 is generally vertically aligned the driveshaft opening 89.

With reference to FIGS. 14 and 15, the intercooler plane 305 forms a tunnel intersection 404 with the tunnel 94 which is entirely disposed below the upper surface 94b of the tunnel 94. On the right side wall 94*a*, the tunnel intersection 404 is disposed vertically higher than the top portion 90 of the intake ramp 88. On the front wall 94*b*, the tunnel intersection 404 passes through the top of the top portion 90. On the left side wall 94*a* of the tunnel 94, the tunnel intersection 404 is disposed vertically lower than the top of the top portion 90. On the left side wall 94*a* of the tunnel 94, the tunnel intersection 404 is generally vertically aligned with the driveshaft opening 89. The driveshaft opening 89 and the upper wall 94*b* of the tunnel 94 are disposed on opposite sides of the intercooler plane 305.

With reference to FIGS. 14 to 16, the intercooler plane 305 forms a right side portion intersection 406 with the right side portion 124 of the hull 12. The right side portion intersection 406 passes through the upper surface 128 of the right side portion 124 in a central portion of the PWC 10 as can be seen in FIG. 16. The right side portion intersection 406 passes through the upper surface 128 of the right side portion longitudinally forward of the engine 22. When viewed from a left side as in FIG. 16, the right side portion intersection 406 slopes downwardly and rearwardly towards the transom 54. At the rear edge of the right side portion 124 (where the right side portion 124 connects to the transom 54), the right side portion intersection 406 is disposed vertically lower than the upper wall 94*b* of the tunnel 94.

With reference to FIG. 14, the intercooler plane 305 forms a left side portion intersection 408 with the left side portion 124 of the hull 12. The left side portion intersection 408 passes through the upper surface 128 of the left side portion 122 of the hull 12 near the bow end 5. The left side portion intersection 408 crosses the bottom edge of the left side portion 122 in a central portion of the hull 12 longitudinally forward of the sponsons 70. Thus, both the left and right side portion intersections 406, 408 of the intercooler plane 305 with the upper surface 128 of the hull 12 are disposed longitudinally forward of the engine 22.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A watercraft comprising:
    a deck;
    a hull disposed under the deck and defining an engine compartment therewith, the hull defining a longitudinal centerplane extending longitudinally and vertically, the hull comprising:
        a transom extending generally laterally and vertically;
        a right side portion extending forwardly from a right side of the transom;
        a left side portion extending forwardly from a left side of the transom;
        a tunnel extending forwardly from the transom, the tunnel being disposed between the left side portion and the right side portion; and
        a bottom portion extending forwardly from a bottom of the transom and a bottom of the tunnel, the bottom portion extending between a bottom of the left side portion and a bottom of the right side portion;
    an engine disposed in the engine compartment and having an engine air inlet;
    a jet propulsion system operatively connected to the engine and disposed at least in part in the tunnel; and
    an air intake system disposed at least in part in the engine compartment and fluidly communicating with the engine air inlet for delivering air thereto, the air intake system comprising an air compressor and an intercooler,
    the intercooler comprising:
        a housing having a lower surface extending generally along the bottom portion of the hull and an upper surface extending above the lower surface;
        an intercooler air inlet fluidly connected to the air compressor;
        an intercooler air outlet fluidly connected to the engine air inlet and being spaced from the intercooler air inlet at least in a direction parallel to the lower surface;
        a water inlet fluidly connected to the jet propulsion system;
        a water outlet fluidly connected to an exterior of the engine compartment; and
        an intercooler core enclosed within the housing and defining:
            at least one air channel fluidly communicating with the intercooler air inlet and the intercooler air outlet; and
            at least one water channel fluidly communicating with the water inlet and the water outlet, the at least one water channel being diathermally connected with the at least one air channel for cooling air flowing in the at least one air channel between the intercooler air inlet and the intercooler air outlet.

2. The watercraft of claim 1, wherein a majority of the intercooler core is disposed below a water line of the watercraft when the watercraft is unloaded and docked in level water.

3. The watercraft of claim 1, wherein:
    an upper surface of the transom is disposed vertically higher than the at least one water channel.

4. The watercraft of claim 1, wherein:
    the tunnel comprises an upper wall; and
    the upper wall of the tunnel is disposed vertically higher than a majority of the at least one water channel.

5. The watercraft of claim 1, wherein:
    the intercooler air inlet has a central intercooler air inlet axis;
    the intercooler air outlet has a central intercooler air outlet axis;
    an intercooler plane containing the central air inlet axis and the central air outlet axis is disposed between the upper and lower surfaces of the intercooler; and
    an intersection of the intercooler plane with the transom is disposed entirely below an upper surface of the transom.

6. The watercraft of claim 5, wherein an intersection of the intercooler plane with the tunnel is disposed vertically lower than an upper wall of the tunnel.

7. The watercraft of claim 6, further comprising:
    a driveshaft; and
    a driveshaft opening defined by the hull, the driveshaft extending through the driveshaft opening for operatively connecting the jet propulsion system to the engine,
    the driveshaft opening and the upper wall of the tunnel being disposed on opposite sides of the intercooler plane.

8. The watercraft of claim 1, further comprising a foam member disposed on the bottom portion of the hull, the lower surface of the intercooler being disposed on the foam member.

9. The watercraft of claim 1, wherein the intercooler core is made of one of:
aluminum and an alloy thereof.

10. The watercraft of claim 1, wherein the intercooler further comprises:
an anode member disposed vertically lower than a water line of the watercraft when the watercraft is unloaded and docked in level water,
the anode member being disposed closer to the lower surface of the intercooler than to the upper surface thereof.

11. The watercraft of claim 10, wherein:
the anode member is disposed on a laterally inner portion of the intercooler.

12. The watercraft of claim 11, wherein:
the intercooler further comprises an anode opening defined in the housing; and
the anode member comprises:
an anode holder mounted to the housing adjacent the anode opening; and
an anode mounted to the anode holder and extending therefrom into the at least one water channel.

13. The watercraft of claim 1, wherein the intercooler is disposed on one side of the longitudinal centerplane and longitudinally rearward of the engine.

14. The watercraft of claim 13, wherein:
the air compressor is a supercharger, the supercharger being disposed rearward of the engine and longitudinally forward of the intercooler.

15. The watercraft of claim 14, wherein the air intake system further comprises:
an airbox fluidly connected to the supercharger for delivering atmospheric air thereto, the airbox being disposed forward of the engine;
the airbox has an airbox air inlet facing generally forwardly away from the engine;
the airbox has an airbox air outlet facing generally rearwardly toward the engine;
the supercharger has a supercharger air inlet facing generally rearwardly away from the engine; and
the intercooler air inlet and the intercooler air outlet face generally forwardly.

16. The watercraft of claim 1, further comprising an exhaust system, the exhaust system including a muffler and a resonator, the muffler and the resonator being disposed longitudinally rearward of the engine, wherein:
the muffler is disposed on one of a left side and a right side of the longitudinal centerplane;
the intercooler is disposed on an other of the left side and the right side of the longitudinal centerplane; and
the resonator is disposed on an upper wall of the tunnel.

17. The watercraft of claim 13, wherein:
the intercooler air inlet has a central intercooler air inlet axis;
the intercooler air outlet has a central intercooler air outlet axis;
an intercooler plane containing the central air inlet axis and the central air outlet axis is disposed between the upper and lower surfaces of the intercooler;
an intersection of the intercooler plane with the transom intersects one of the left side portion and the right side portion of the hull, the one of the left side portion and the right side portion extending on the same side of the longitudinal centerplane as the intercooler; and
the intersection of the intercooler plane with the transom intersects the bottom portion on an opposite side of the longitudinal centerplane from the intercooler.

18. The watercraft of claim 13, wherein:
the intercooler air inlet has a central intercooler air inlet axis;
the intercooler air outlet has a central intercooler air outlet axis;
an intercooler plane containing the central air inlet axis and the central air outlet axis is disposed between the upper and lower surfaces of the intercooler; and
an intersection of the intercooler plane with the transom is disposed generally parallel to a portion of the bottom portion of the hull disposed below the intercooler.

19. The watercraft of claim 13, wherein:
the intercooler air inlet has a central intercooler air inlet axis;
the intercooler air outlet has a central intercooler air outlet axis;
an intercooler plane containing the central air inlet axis and the central air outlet axis is disposed between the upper and lower surfaces of the intercooler; and
an intersection of the intercooler plane with an upper surface of the hull is disposed longitudinally forward of the engine.

20. The watercraft of claim 19, wherein the intersection of the intercooler plane with the upper surface of the hull disposed longitudinally forward of the engine comprises:
a left side portion intersection of the intercooler plane with the left side portion of the hull; and
a right side portion intersection of the intercooler plane with the right side portion of the hull.

* * * * *